US008258090B2

(12) United States Patent
Avataneo et al.

(10) Patent No.: US 8,258,090 B2
(45) Date of Patent: Sep. 4, 2012

(54) FLUORINATED LUBRICANTS

(75) Inventors: Marco Avataneo, Senago (IT); Pier Antonio Guarda, Arese (IT); Giuseppe Marchionni, Milan (IT); Patrizia Maccone, Milan (IT); Giovanni Boccaletti, Roncoferraro (IT)

(73) Assignee: Solvay Solexis S.p.A., Bollate (IT)

( * ) Notice: Subject to any disclaimer, the term of this patent is extended or adjusted under 35 U.S.C. 154(b) by 533 days.

(21) Appl. No.: 12/516,048

(22) PCT Filed: Nov. 29, 2007

(86) PCT No.: PCT/EP2007/062998
§ 371 (c)(1),
(2), (4) Date: May 22, 2009

(87) PCT Pub. No.: WO2008/065163
PCT Pub. Date: Jun. 5, 2008

(65) Prior Publication Data
US 2010/0105584 A1 Apr. 29, 2010

(30) Foreign Application Priority Data

Nov. 30, 2006 (IT) .............................. MI2006A2309
Nov. 30, 2006 (IT) .............................. MI2006A2310

(51) Int. Cl.
*C10M 105/18* (2006.01)
(52) U.S. Cl. ........................................ 508/582; 568/615
(58) Field of Classification Search ................... 568/577, 568/615; 508/582
See application file for complete search history.

(56) References Cited

U.S. PATENT DOCUMENTS

| | | | |
|---|---|---|---|
| 3,067,262 A | 12/1962 | Brady | |
| 3,214,478 A | 10/1965 | Milian | |
| 3,242,218 A | 3/1966 | Miller | |
| 3,493,530 A | 2/1970 | Sianesi et al. | |
| 3,665,041 A | 5/1972 | Sianesi et al. | |
| 3,715,378 A | 2/1973 | Sianesi et al. | |
| 3,810,875 A | 5/1974 | Rice et al. | |
| 3,847,978 A | 11/1974 | Sianesi et al. | |
| 3,882,193 A * | 5/1975 | Rice et al. ..................... | 528/271 |
| 4,308,393 A | 12/1981 | Apotheker | |
| 4,451,646 A | 5/1984 | Sianesi et al. | |
| 4,500,739 A | 2/1985 | Caporiccio et al. | |
| 4,523,039 A | 6/1985 | Lagow et al. | |
| 4,681,693 A | 7/1987 | Gavezotti et al. | |
| 4,946,936 A | 8/1990 | Moggi et al. | |
| 5,000,830 A | 3/1991 | Marchionni et al. | |
| 5,258,110 A | 11/1993 | Sianesi et al. | |
| 5,534,176 A | 7/1996 | Nalewajek et al. | |
| 5,744,651 A | 4/1998 | Marchionni et al. | |
| 5,969,192 A | 10/1999 | Marchionni et al. | |
| 6,025,307 A | 2/2000 | Chittofrati et al. | |
| 6,160,051 A | 12/2000 | Tatsu et al. | |
| 6,982,173 B2 | 1/2006 | Marchionni et al. | |

| | | |
|---|---|---|
| 2003/0203823 A1 | 10/2003 | Navarrini et al. |
| 2003/0235685 A1 | 12/2003 | Lofton et al. |
| 2004/0192974 A1 | 9/2004 | Navarrini et al. |
| 2005/0075250 A1 | 4/2005 | Maccone et al. |
| 2005/0187116 A1 | 8/2005 | Russo et al. |
| 2005/0192413 A1 | 9/2005 | Marchionni et al. |

FOREIGN PATENT DOCUMENTS

| | | |
|---|---|---|
| EP | 148482 A2 | 7/1985 |
| EP | 0501533 A2 | 9/1992 |
| EP | 0695775 A1 | 2/1996 |
| EP | 1331229 A1 | 7/2003 |
| EP | 1454938 A1 | 9/2004 |
| GB | 837764 A | 6/1960 |
| GB | 1104482 A | 2/1968 |
| GB | 1226566 A | 3/1971 |

OTHER PUBLICATIONS

U.S. Appl. No. 12/516,086, filed Nov. 29, 2007, Abusleme et al., US Natl Stage Entry May 22, 2009.
U.S. Appl. No. 12/516,158, filed Nov. 29, 2007, Marchionni, et al., US Natl Stage Entry May 22, 2009.
ASTM D 4172-94 (2004), Standard Test Method for Wear Preventive Characteristics of Lubricating Fluid (Four-Ball Method)—Reapproved 2004, 6 pp.
ASTM D 445-03, Standard Test Method for Kinematic Viscosity of Transparent and Opaque Liquids (and the Calculation of Dynamic Viscosity), Apr. 2003, 10 pp.
ASTM D 2595-96 (2002), Standard Test Method for Evaporation Loss of Lubricating Greases Over Wide-Temperature Range, Reapproved 2002, 4 pp.
ASTM D 217-02, Standard Test Methods for Cone Penetration of Lubricating Grease, 2002, 15 pp.
ASTM D 1403-02 Standard Test Methods for Cone Penetration of Lubricating Grease Using One-Quarter and One-Half Scale Cone Equipment, 2002, 9 pp.

(Continued)

*Primary Examiner* — Jim Goloboy
(74) *Attorney, Agent, or Firm* — Arent Fox LLP

(57) ABSTRACT

Fluorinated lubricants of formula:

$$\text{T-O-[A-B]}_z\text{-[A-B']}_{z'}\text{-A-T'} \qquad (I)$$

wherein:

$A = -(X)_a - O - A' - (X')_b$ wherein A' is a perfluoropolyether chain comprising units $(CF_2O)$, $(CF_2CF_2O)$, $(CF_2CF_2CF_2O)$, $(CF_2CF_2CF_2CF_2O)$; X, X'=—$CF_2$—, —$CF_2CF_2$—; a, b=0 or 1;

B derives from olefins, of which at least one homopolymerizable by radical route, of formula:

$$-[(CR_1R_2-CR_3R_4)_j(CR_5R_6-CR_7R_8)_{j'}]- \qquad (Ia)$$

wherein j=1-5, j'=0-4 and 2<(j+j')<5; $R_1$-$R_8$=halogen, H, $C_1$-$C_6$ (per)haloalkyl, $C_1$-$C_6$ alkyl, $C_1$-$C_6$ oxy(per)-fluoroalkyl;

$z \geq 2$; z' is 0 or an integer; z, z' are such that the number average molecular weight of the polymer of formula (I) is in the range 500-500,000;

B'=(Ia) but at least one of $R_1$-$R_8$ has a meaning different than that in B and $2 \leq (j+j') < 5$;

T, T'=$C_1$-$C_3$ perfluoroalkyl, $C_1$-$C_6$ alkyl and compositions thereof.

20 Claims, No Drawings

OTHER PUBLICATIONS

ASTM D 2266-01, Standard Test Method for Wear Preventive Characteristics of Lubricating Grease (Four-Ball Method), 2001, 4 pp.

ASTM D 2575-70 (98), Standard Methods of Testing Polymerized Fatty Acids, Reapproved 1998, 3 pp.

* cited by examiner

FLUORINATED LUBRICANTS

CROSS-REFERENCE TO RELATED APPLICATIONS

This application is a U.S. national stage application under 35 U.S.C. §371 of International Application No. PCT/EP2007/062998 filed Nov. 29, 2007, which claims priority to Italian Application No. MI2006A002310 filed Nov. 30, 2006 and Italian Application No. MI2006A002309 filed Nov. 30, 2006, these applications being incorporated herein by reference in their entirety for all purposes.

The present invention relates to polymers containing blocks deriving from perfluoropolyether (PFPE) and blocks formed of repeating units deriving from halogenated and/or hydrogenated olefins, usable as lubricants having low wear values.

In particular the present invention refers to polymers having alternate blocks -A-B-A-B-A- wherein blocks A derive from PFPE and blocks B derive from olefins, as defined above.

More specifically the invention concerns block polymers having improved wear in combination with low glass transition temperature (Tg), low evaporation loss at high temperatures and high viscosities when the polymers are liquid at room temperature.

As known, the perfluoropolyethers are polymers having very low Tg due to the presence of ether bonds in the repeating units forming the backbone. The linear chain perfluoropolyethers, for example Fomblin® Z and M, commercialized by Solvay Solexis S.p.A, have Tg of about −130° C. and a maximum viscosity of about 1,300 cSt at 20° C. These polymers however show the drawback to have also increased wear as the viscosity increases. Therefore the lubricant properties are impaired. The wear is about 1.5 mm for a viscosity of about 300 cSt. (See the comparative examples).

Where viscosities higher than 1,300 cSt are required, perfluoropolyether oils having a branched backbone, for example Fomblin® Y commercialized by Solvay Solexis, are used as they show higher viscosities, even up to 1,800 cSt at 20° C. At these viscosities the wear is about 1.2 mm measured according to ASTM D 4172. As a matter of fact Fomblin® Y show wear lower than Fomblin® Z and M, the viscosity being the same. However Fomblin® Y show a Tg around −65° C. and therefore higher than Fomblin® Z and M. As well known, the Tg is tied to the pour point of the oil. It follows that a higher Tg brings to a higher pour point. Therefore, at low temperatures, Fomblin® Y has a thinner application field compared to Fomblin® Z and M. Further Fomblin® Y show a greater evaporation loss than Fomblin® M and Z, the viscosity being the same.

Perfluoropolyether-blocks containing polymers having very high viscosities are known in the prior art. For example U.S. Pat. No. 3,493,530 describes perfluoropolyether polymers having a very high viscosity, containing branched perfluorooxyalkylene units and units deriving from radicalic homopolymerizable fluoroolefins. The Tg of these polymers is not reported. However this should have the same magnitude of Fomblin® Y oils as the branched perfluoropolyether unit is structurally similar to Fomblin Y. Therefore said polymers cannot be used at low temperature, for example lower than −65° C. Further this patent does not report either the wear or weight loss at high temperatures.

U.S. Pat. No. 4,500,739 describes perfluoropolyethers having a structure of Fomblin® Z, having high viscosities and containing in the chain one or two monomeric units deriving from non homopolymerizable fluoroolefins by radical route, for example hexafluoropropene, perfluoroalkylvinylethers. In this patent it is described that the use of said fluoroolefins highly prevents the degradation of the perfluoropolyether peroxidic precursor during the reduction of the peroxidic bonds and allows to maintain substantially unchanged the usual perfluoropolyether properties. In this way the reduction reaction yield is improved, and high viscosity perfluoropolyethers are obtained. These polymers substantially show the same characteristics of Fomblin® Z and M, i.e. an increased wear as the viscosity and the molecular weight increase. This patent does not report either wear or evaporation loss.

Polymers containing two or three (per)fluoropolyether blocks are also known. These polymers have structure A-B or B-A-B wherein A is a perfluoropolyether block and B is a block derived from the polymerization of one or more olefins. See for example the patent EP 501,533. The polymers exemplified in this patent show low molecular weights, at most 6,200, and therefore they have significant evaporation losses at high temperatures. Besides, for increasing the molecular weight of the polymers, the teaching of this patent is to increase the lengths of the block A and/or B. When block A has a higher length, a high wear, typical of perfluoropolyether oils, is obtained. In fact the latter increases as the molecular weight rises. When the length of B is increased, the polymer shows a high crystallinity and high wear. See the comparative examples. Furthermore this patent does not report either wear or evaporation loss.

U.S. Pat. No. 4,946,936 describes (per)fluoropolyethers containing polymers formed of two or three blocks having structure A-B or B-A-B as defined in the above EP 501,533, but wherein the fluoroolefinic blocks B are terminated with one Br atom. These polymers are used as additives in the fluoroelastomer curing. In this patent neither wear nor loss weight data of the polymers are reported.

U.S. Pat. No. 3,810,875 describes polymers having low Tg and containing perfluoropolyether blocks and polymeric blocks deriving from hydrogenated and/or halogenated olefins. These crosslinked polymers are used as elastomers in the preparation of fittings, O-rings and manufactured articles. Neither wear nor weight loss data are reported in this patent.

The need was felt to have available perfluoropolyether polymers to be used as lubricants showing the following combination of properties:

improved wear, that is low wear values, in particular lower than 1.5 mm, preferably lower than 1.2 mm, more preferably lower than or equal to 1 mm, even at high molecular weights, for example higher than 20,000, even up to about 80,000;

low Tg, in particular in the range between −100° C. and −130° C.;

viscosity values even higher than 1,800 cSt at 20° C.;

low evaporation loss.

The Applicant has surprisingly and unexpectedly found particular perfluoropolyether polymers showing the combinations of the above properties and thus solving the technical problem of the invention.

It is therefore an object of the present invention perfluoropolyether polymers of formula (I)

   (I)

wherein:

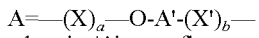

wherein A' is a perfluoropolyether chain comprising one or more repeating units selected from $(CF_2O)$, $(CF_2CF_2O)$, $(CF_2CF_2CF_2O)$, $(CF_2CF_2CF_2CF_2O)$, optionally comprising $(CF(CF_3)O)$, $(CF(CF_3)CF_2O)$, $(CF_2CF(CF_3)O)$ units, having a number average molecular weight between 66 and 50,000; X, X', equal to or different from each other, are —CF$_2$—, —CF$_2$CF$_2$— and optionally —CF(CF$_3$)—;

a, b, equal to or different from each other, are integers equal to 0 or 1 with the proviso that the block A linked to the end group T-O— has a=1 and the block A linked to the end group T' has b=0;

B is a block formed of units deriving from one or more olefins, wherein at least one of them is homopolymerizable by radical route, having formula:

—[(CR$_1$R$_2$—CR$_3$R$_4$)$_j$(CR$_5$R$_6$—CR$_7$R$_8$)$_{j'}$]— (Ia)

wherein j is an integer from 1 to 5, j' is an integer from 0 to 4 with the proviso that (j+j') is higher than 2 and lower than 5;

R$_1$, R$_2$, R$_3$, R$_4$, R$_5$, R$_6$, R$_7$, R$_8$, equal to or different from each other, are selected from halogen, preferably F, Cl; H; C$_1$-C$_6$ (per)haloalkyl, wherein the halogen is preferably F, Cl; C$_1$-C$_6$ alkyl, optionally containing heteroatoms, as O, N, S; C$_1$-C$_6$ oxy(per)fluoroalkyl;

z is an integer higher than or equal to 2; z' is 0 or an integer; z, z' are such that the number average molecular weight of formula (I) is in the range 500-500,000, preferably 1,000-80,000, more preferably 5,000-60,000;

B' is a block deriving from one or more olefins and having formula (Ia), but having at least one of the substituents R$_1$ to R$_8$ different than in block B, (j+j') being higher than or equal to 2 and lower than 5;

the end groups T and T', equal to or different from each other, are perfluoroalkyl from 1 to 3 carbon atoms, one fluorine atom can be substituted by one chlorine or hydrogen atom; C$_1$-C$_6$ non fluorinated alkyl groups.

Preferably A' has a number average molecular weight in the range 300-10,000, more preferably 500-5,000. Block A is preferably selected from the following structures:

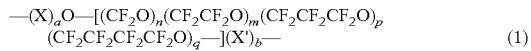

—(X)$_a$O—[(CF$_2$O)$_n$(CF$_2$CF$_2$O)$_m$(CF$_2$CF$_2$CF$_2$O)$_p$
(CF$_2$CF$_2$CF$_2$CF$_2$O)$_q$—](X')$_b$— (1)

wherein

X, X', equal to or different from each other are —CF$_2$—, —CF$_2$CF$_2$—; a, b are as above defined; m, n, p, q are integers, zero comprised, such that m/n is between 0.1 and 10 when n is different from zero; (p+q)/(n+m+p+q) is between 0 and 0.05, (n+m+p+q) being different from 0.

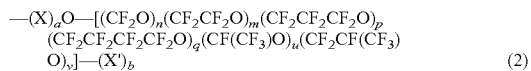

—(X)$_a$O—[(CF$_2$O)$_n$(CF$_2$CF$_2$O)$_m$(CF$_2$CF$_2$CF$_2$O)$_p$
(CF$_2$CF$_2$CF$_2$CF$_2$O)$_q$(CF(CF$_3$)O)$_u$(CF$_2$CF(CF$_3$)
O)$_v$]—(X')$_b$ (2)

wherein

X, X', equal to or different from each other, are —CF$_2$—, —CF(CF$_3$)—, —CF$_2$CF$_2$—; a, b are as defined above;

m is an integer higher than or equal to 1, the n, p, q, u, v indexes are integers including zero, with the proviso that (p+q)/(v+m) is between 0 and 0.05 when (v+m) is different from zero; the (v+u)/(n+m) ratio is lower than 1 when (n+m) is different from zero.

Block B derives from one or more homopolymerizable olefins by radical route, for example tetrafluoroethylene (TFE), ethylene (E), vinylidene fluoride (VDF), chlorotrifluoroethylene (CTFE), optionally in the presence of non homopolymerizable olefins by radical route, for example hexafluoropropene (HFP), (per)fluorovinylethers, propylene, etc.

Block B' derives from one or more homopolymerizable or non homopolymerizable olefins by radical route. The olefins indicated for B can be used for obtaining block B'. The preferred olefins for B' are the preferred olefins of B.

B and B' blocks containing units deriving from perfluorinated olefins are preferred. Examples of these olefins are TFE and HFP mixtures. Other preferred B, B' blocks are those containing units deriving from at least one homopolymerizable perfluorinated olefin by radical route, for example TFE, and at least one non perfluorinated olefin, for example ethylene, vinylidene fluoride (VDF). Polymers of formula (I) wherein z'=0 are more preferred.

The total weight of the blocks B, B' is generally lower than 70% of the total weight of the polymer of formula (I), preferably lower than 60%, more preferably lower than 40%.

In particular in formula (I) the end groups T and T', equal to or different from each other, are —CF$_3$, —C$_2$F$_5$, —C$_3$F$_7$, —CF$_2$H, —CF$_2$CF$_2$H, —CFHCF$_3$, —CF$_2$Cl, —C$_2$F$_4$Cl, —CH$_3$, —C$_2$H$_5$, —C$_3$H$_7$.

The alternated block polymers of formula (I) of the present invention are characterized by having the bond between the block A and the block B of —O—C— or —C—C— type. As said, the polymers of the present invention are characterized in having blocks B, B' having a well defined and controlled length. This allows to obtain perfluoropolyethers of formula (I) having the typical properties of perfluoropolyethers, for example low Tg, good thermal and thermooxidative stability and, at the same time having a broader viscosity range, even higher than 1,800 cSt at 20° C.

The viscosity of the polymer of formula (I) can also be very high, even of 50,000 cSt at 20° C. or higher. The polymers can also be substantially solid.

Furthermore the polymers of the invention surprisingly and unexpectedly do not show the Tg at the DSC, typical of the B, B' blocks. This is unexpected as in the prior art it is known that polymers, in particular the polymers containing olefinic blocks and perfluoropolyether blocks, show always two Tg. See for example U.S. Pat. No. 4,946,936. It has been further observed that the Tg of the polymers of formula (I) of the present invention is not substantially affected by the weight of B, B' blocks.

Furthermore it is surprising and unexpected that the polymers of formula (I) of the present invention do not show the melting temperatures typical of the blocks B, B'. This is also true when the sum of B, B' is high. See the comparative examples.

The Applicant has also surprisingly an unexpectedly found that the polymers of the present invention show a low wear, even when molecular weights are high and viscosities are high. The polymers of the present invention show a low wear, generally lower than 1.2 mm even at high molecular weights.

The polymer of formula (I) is obtained through a polymerization process which brings to a polymeric mixture wherein the polymer chains have different value of (j+j'). The average value of (j+j') of the polymeric mixture can also be a fractional number.

The process for preparing the polymers of formula (I) comprise the following steps:

(a) reaction of a peroxidic perfluoropolyether comprising at least one of the following units: (CF$_2$O), (CF$_2$CF$_2$O), (CF$_2$CF$_2$CF$_2$O), (CF$_2$CF$_2$CF$_2$CF$_2$O), having peroxidic content (PO), defined as g of active oxygen (molecular weight=16) in 100 g of perfluoropolyether peroxide, between 0.1 and 4, preferably between 0.1 and 3.5, with at least one homopolymerizable olefin by radical route, optionally in the presence of one or more non homopolymerizable olefins by radical route, at temperatures between 125° C. and 280° C. and at a pressure between 1 bar and 50 absolute bar, by feeding the olefin until obtaining a polymer having a PO lower than 0.1, generally lower than 0.05, preferably a PO lower than 0.02, more preferably lower than 0.01, the ratio between the moles of the olefin and the moles of peroxidic units (moles of —O—O—) of the perfluoropolyether ranges from 1 to 15, preferably 1-10;

(b) thermal treatment of the polymer obtained in (a), at temperatures in the range 200° C.–280° C., until removal of the peroxidic content in the polymer;

(c) neutralization of the polymer obtained in (b) for obtaining the polymers of formula (I).

In step (a) optionally more homopolymerizable olefins by radical route can be used.

The temperature in step a) is preferably between 180° C. and 230° C. The pressure in step a) is preferably between 1 and 10 absolute bar.

Step (a) can optionally be carried out in the presence of a fluorinated solvent. The amount of the latter is preferably such as to have a peroxidic perfluoropolyether content between 1% and 50% by weight with respect to the total weight of the solvent plus peroxidic perfluoropolyethers, preferably 5%-30% by weight. Preferably the solvent solubilizes the peroxidic perfluoropolyether at the reaction temperature of step a) and is not reactive towards the radical species formed in the reaction of step a), for example (per) fluoroalkyl or perfluorooxyalkyl radicals. Preferably the solvent is selected from perfluorocarbons, hydrofluorocarbons, perfluoropolyethers and hydrofluoropolyethers, more preferably perfluoropolyethers, such as Galden®, and hydrofluoropolyethers such as H-Galden®. When a solvent is used in step a), the starting peroxidic perfluoropolyether can have an active oxygen (PO) content even up to 5.

The starting peroxidic perfluoropolyether can also optionally contain one or more of the following units: $(CF(CF_3)O)$, $(CF(CF_3)CF_2O)$, $(CF_2CF(CF_3)O)$. In general the end groups of the peroxidic perfluoropolyether are $C_1$-$C_3$ (per)fluoroalkyls, optionally containing one or more chlorine atoms, preferably one Cl atom, or functional end groups as acyl fluorides, fluoroformates and ketones. The peroxidic perfluoropolyether preferably is selected from the following classes:

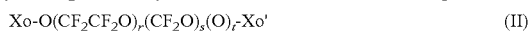

$$Xo\text{-}O(CF_2CF_2O)_r(CF_2O)_s(O)_t\text{-}Xo' \quad (II)$$

wherein

Xo and Xo', equal to or different from each other, are —$CF_2Cl$, —$CF_2CF_2Cl$, —$CF_3$, —$CF_2CF_3$, —$CF_2COF$, —COF;

r, s and t are integers such that the number average molecular weight is generally in the range 400-150,000, preferably 500-80,000; r/s is between 0.1 and 10, s being different from zero; t is an integer such that the PO is in the above defined range.

The peroxidic perfluoropolyethers of formula (II) can be prepared by tetrafluoroethylene oxypolymerization by following the teachings of U.S. Pat. No. 3,715,378, U.S. Pat. No. 4,451,646, U.S. Pat. No. 5,258,110, U.S. Pat. No. 5,744,651;

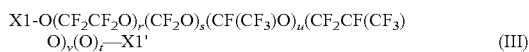

$$X1\text{-}O(CF_2CF_2O)_r(CF_2O)_s(CF(CF_3)O)_u(CF_2CF(CF_3)O)_v(O)_t\text{-}X1' \quad (III)$$

wherein

X1 and X1', equal to or different from each other, are —$CF_2Cl$, —$CF_2CF_2Cl$, —$CF_2CF_3$, —$CF_3$, —$C_3F_7$, —$CF(CF_3)COF$, —COF;

r, s, t, u, v are integers such that the number average molecular weight is in the range 500-150,000, preferably 700-80,000; v/(r+s+u) is lower than 1 and t is a number such that the PO is within the above defined range.

The peroxidic perfluoropolyethers of formula (III) can be prepared by tetrafluoroethylene and perfluoropropene oxypolymerization by following the teachings of U.S. Pat. No. 5,000,830;

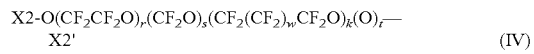

$$X2\text{-}O(CF_2CF_2O)_r(CF_2O)_s(CF_2(CF_2)_wCF_2O)_k(O)_t\text{-}X2' \quad (IV)$$

wherein

X2 and X2', equal to or different from each other, are —$CF_2COF$, —COF;

w=1 or 2;

r, s, t and k are integers such that the number average molecular weight is in the range 700-100,000, preferably 700-80,000; r/s is between 0.2 and 10, k/(r+s) is lower than 0.05 and t is a number such that the PO is as defined above.

The peroxidic perfluoropolyethers of formula (IV) can be obtained according to the teachings of the patent application US 2005/0,192,413.

Preferably the peroxidic perfluoropolyethers are those of the classes (II) and (III), more preferably class (II).

The peroxidic perfluoropolyethers can be subjected, before step (a), to a partial reduction of the peroxidic bonds by chemical reduction according to the teachings reported in U.S. Pat. No. 4,451,646, U.S. Pat. No. 3,847,978 herein incorporated by reference; or by thermal treatment according to U.S. Pat. No. 3,715,378, herein incorporated by reference. Preferably the chemical reduction is carried out by using a reducing agent as gaseous hydrogen, optionally in the presence of a catalyst, preferably Pd, Pt, Ru. The treatment allows furthermore to control the molecular weight.

The thermal treatment can be carried out for example at temperatures between 100° C. and 250° C., optionally in the presence of an inert solvent, for example halogenated solvents.

In step (a) the ratio between the olefins and the peroxidic units (PO) is a function of the percentage of olefinic units in the final polymer of formula (I). Generally the ratio depends also on the olefin solubility in the reaction mixture, the temperature, the pressure, the olefin reactivity and the presence of other olefins. When very reactive olefins are used, the molar ratio olefin/peroxide (in the PFPE) is preferably lower than 5. The same takes place when the temperature and pressure allow to have a high concentration of olefin in the liquid phase. In case olefins difficult to homopolymerize, or mixtures of two or more olefins, homopolymerizable or not, are used, preferably said ratio is comprised between 5 and 15.

Step (a) can be carried out under batch-, semibatch-, or continuous-conditions. In the batch process the peroxidic PFPE and the olefins are fed into the reactor before the reaction starts.

In the semibatch process the peroxidic PFPE is fed into the reactor before the reaction starts while the olefin, or the mixture of olefins, is continuously fed during the reaction. Also the inverse process can be used.

In the continuous process the peroxidic PFPE and the olefins are continuously fed and the reaction mixture is withdrawn from the reactor.

The feeding of the olefin in the continuous or semibatch processes can be carried out with a flow-rate constant or not, but with the condition that the ratio between the olefin and peroxidic units (moles of —O—O— bonds) be in the above range. When a semibatch or batch process is used, it is preferable to carry out the reaction by using a temperature gradient, for example starting from a predetermined temperature, for example 180° C., reaching 230° C. The time to reach the highest temperature of the gradient is generally of 3 to 8 hours.

When more olefins are used in step (a) it is possible to feed them separately, in a sequent way or not. In this case, the polymers of formula (I) contain the blocks B'.

In step (a) the PO is determined according to the method reported below.

Step (a) can be carried out in the presence of UV radiations, having a wavelength preferably comprised between 200 and 350 nm, at temperatures generally between −100° C. and +100° C., preferably −80° C. and +80° C., more preferably between −60° C. and +60° C. In this embodiment the ratio between the moles of the olefin and the moles of peroxidic units of the peroxidic PFPE (moles of —O—O— bonds) is preferably between 1 and 10. A solvent transparent to UV radiation is preferably used in this embodiment. Examples of solvents are those listed under step (a) provided that they are transparent at UV. The pressure is preferably lower than 5 absolute bar, by using a batch or semibatch process.

Step (b) is carried out to completely remove the peroxidic content of the polymer obtained in step (a). Complete removal of the peroxidic content means that the peroxide content is under the analytical limit by using the determination method indicated in the characterization in the examples.

Step (b) can be carried out by photochemical-, thermal-route. The latter is preferred and is carried out, for example, by heating the mixture obtained in a) at temperatures from 200° C. to 280° C., preferably 220-250° C., until the disappearance of the peroxide content. See for example U.S. Pat. No. 3,715,378 and EP 1,454,938, herein incorporated by reference. When step (b) is carried out by photochemical route, preferably in the presence of UV radiations, the temperature of the treatment is between −100° C. and +100° C., as a preferred range.

In step (c) the neutralization of the reaction mixture obtained in b) can be carried out according to various methods. For example it can be mentioned the fluorination, for example as described in GB 1,226,566, the decarboxylation, as described in U.S. Pat. No. 5,969,192, or the alkylation, as described in U.S. Pat. No. 6,982,173 and US 2004/192,974. These patents are herein incorporated by reference. The reaction chosen for the neutralization mainly depends on the olefins used in step (a). In case of perfluorinated olefins, it is preferable to carry out the fluorination, preferably with fluorine. For an hydrogenated olefin, the decarboxylation or alkylation reaction are preferred.

For the fluorination reaction in step (c), it is preferable to subject the polymer obtained in (b) to hydrolysis before step (c). In this way the acyl fluoride end groups obtained in step (b) are transformed into —COOH end groups. After fluorination the end groups obtained are —$CF_3$, —$C_2F_5$, —$C_3F_7$, —$CF_2Cl$, —$C_2F_4Cl$.

When the decarboxylation is used in step (c) the terminal end groups of the polymers obtained are —$CF_2H$, —$CF_2CF_2H$, —$CF(CF_3)H$, optionally in admixture with —$CF_3$, —$C_2F_5$, —$C_3F_7$, —$CF_2Cl$, —$C_2F_4Cl$.

When alkylation reaction is used, the terminal end groups are —$CH_3$, —$C_2H_5$, —$C_3H_7$, optionally in admixture with —$CF_3$, —$C_2F_5$, —$C_3F_7$, —$CF_2Cl$, —$C_2F_4Cl$.

After step (c), optionally step (d) is carried out for the removal of the solvent, in particular when a solvent is used in step (a). Step (d) can be carried out by evaporation, preferably by distillation under vacuum.

The Applicant has surprisingly and unexpectedly found that with the process of the present invention it is possible to introduce in the block B, and optionally in B', even high amounts of non homopolymerizable olefins by radical route, fluorinated or not, as for example hexafluoropropene, propylene, etc.

The polymers of formula (I) are used as lubricants.

It has been further found that also polymers of formula (I) but having (j+j') from 5 to 10 (included these values) can be used as lubricant too.

The Applicant has furthermore found that, by operating with a molar ratio between olefin and peroxidic units between 15 and 25, it is possible to obtain polymers of formula (I) with (j+j') between 5 and 10 showing low wear.

It is therefore a further object of the present invention the use as lubricants of polymers of formula (I) having (j+j') higher than 2 and lower than or equal to 10. These lubricants show a low value of wear. Tests carried out by the Applicant have shown that when (j+j') is higher than 10, the wear values are very poor (see the comparative examples).

It is furthermore surprising and unexpected that also the polymers of formula (I) having (j+j') from 5 to 10 do not show any increase of the Tg. The lubricants can be both in solid form and in liquid form.

The lubricants are applied to the surface to be lubricated preferably by dissolving or dispersing the polymers having (j+j') from 2 to 10 (included) in (per)fluorinated solvents, as for example perfluoropolyethers as Galden of general formula $CF_3O$—$(CF_2C(CF_3)O)_{m1}(CF_2O)_{n1}$—$CF_3$, as Galden HT55 (Bp=about 55° C.); perfluoroalkanes as perfluorooctane, perfluorohexane; hydrofluoroalkanes as $C_5H_2F_{10}$ (Vertrel); (per)fluorocycloalkanes as cyclo-$C_5H_3F_7$ Zeorora-H®); hydrofluoroethers as methoxy-nonafluorobutane (HFE-7100), ethoxy-nonafluorobutane (HFE-7200), 2-trifluoromethyl-3-ethoxydecafluorohexane (HFE-7500); hydrofluoropolyethers, for example H-Galden of general formula $CF_2H$—$(CF_2CF_2O)_{m2}(CF_2O)_{n2}$—$CF_2H$, as H-Galden ZV60 (Bp=about 60° C.), H-Galden ZT130 (Bp=about 130° C.), H-Galden ZT180 (Bp=about 180° C.). When the polymers contain B, B' segments derived from hydrogenated olefinic monomers, they can be soluble also in hydrogenated solvents as acetone, dimethylacetamide, depending on the total content by weight of B, B' of the polymer. The concentration of the polymer having (j+j') higher than 2 and lower or equal to 10 in the solvents is between 0.1% and 30% by weight, preferably 0.5%-10%, still more preferably 1%-5%. The obtained compositions can be applied on the surfaces to be lubricated to obtain a lubricating film, preferably homogeneous. The solvent is eliminated from the surface, preferably by evaporation. The compositions polymer/solvent are applied by known techniques, as dip-coating, spray-coating, casting, spin-coating, etc. In this way an homogeneous lubricating thin film is obtained. The lubricant can be applied also to irregular surfaces, for example microgears, electric contacts, etc.

The lubricant compositions can optionally contain one or more additives, for example antirust, antioxidants, thermal stabilizers, pour point depressant, antiwear for high pressures, antiwear, dispersants, tracing agents and dyestuffs. Dinitro aromatic derivatives of perfluoropolyethers, pyridine derivatives of perfluoropolyethers, arylphosphines can be mentioned as thermal stabilizer additives, see for example patent applications US 2003/0203823, US 2003/0235685, and U.S. Pat. No. 4,681,693. As anti-wear additives, the molybdenum sulphide; organic molybdenum compounds, boron nitride, graphite, phosphazene derivatives, in particular phosphazene derivatives containing perfluoropolyether chains, can be mentioned, see for example patent application US 2005/0187116. As anti-rust additives, the disodic sebacate, sodium carbonate, functionalized derivatives of carboxylic acids containing perfluoropolyether chains can be mentioned, see for example U.S. Pat. No. 6,025,307. The amount of additive is such as to have ratio by weight between the additive and the sum (additive+polymer (I)) between 0.005 and 0.1.

It is a further object of the present invention lubricant compositions having improved wear values and friction coefficient, even at high viscosities, in combination with an improved oil separation upon storage (i.e. lower separation) and a lower oil evaporation loss, low Tg, in particular lower than −100° C.

An object of the present invention are lubricant compositions which comprise:
(i) a polymer of formula (I) as above defined with (j+j') from 2 to 10 (extremes included);
and
one or more components selected from
(ii) an oil having viscosity at 20° C. between 10 and 4,000 cSt, preferably 30 and 2,000 cSt;
(iii) a thickening agent.
Component (ii) can be a fluorinated- or a hydrogenated-oil. As fluorinated oils:
those deriving from fluorotelomers, see for example EP 1,331,229, in particular TFE telomers, see for example U.S. Pat. No. 3,067,262;
those obtained by polymerization of alkenes with perfluoroalkyl end groups, see for example U.S. Pat. No. 5,534,176;
those fluorine-containing organo-silicones, see for example U.S. Pat. No. 4,308,393;
those containing chlorine, as for example chlorotrifluoroethylene (CTFE) oligomers, see for example GB 837,764;
perfluoropolyether oils comprising one or more of the following repeating units: —CFXO— wherein X is equal to F or $CF_3$; —$CF_2CF_2O$—, —$CF_2CF(CF_3)O$—, —$CF(CF_3)CF_2O$—, —$CF_2CF_2CF_2O$—, —$CF_2CF_2CF_2CF_2O$—, the units being statistically distributed along the backbone.

The perfluoropolyether oils are preferably selected from the following classes:

$$E-O-(CF_2CF(CF_3)O)_{m'}(CFXO)_{n'}-E' \quad (1a)$$

wherein
X is equal to F or $CF_3$;
E and E', equal to or different from each other, are selected from $CF_3$, $C_2F_5$ or $C_3F_7$, one fluorine atom of one or both the end groups can be substituted by Cl and/or H;
m' and n' are integers such that the m'/n' ratio is between 20 and 1,000, n' being different from zero; the various units are statistically distributed along the chain, the product viscosity being as defined above.
These products can be obtained by perfluoropropene photooxidation, as described in GB 1,104,432, and by subsequent conversion of the end groups, as described in GB 1,226,566;

$$C_3F_7O(CF(CF_3)CF_2O)_{o'}-D \quad (2a)$$

wherein
D is equal to –$C_2F_5$ or —$C_3F_7$, one fluorine atom of one or both the end groups can be substituted by Cl and/or H;
o' is an integer such that the product viscosity is as defined above.
These products can be prepared by ionic oligomerization of the perfluoropropylenoxide and subsequent treatment with fluorine, as described in U.S. Pat. No. 3,242,218;

wherein
p' is an integer such that the product viscosity is as defined above, one F atom of one or both the $C_3F_7$ end groups can be substituted by Cl and/or H.
These products can be obtained by ionic telomerization of the perfluoropropylenoxide and subsequent photochemical dimerization, as reported in U.S. Pat. No. 3,214,478;

$$E-O-(CF_2CF(CF_3)O)_{q'}(C_2F_4O)_{r'}(CFXO)_{s'}-E' \quad (4a)$$

wherein
X is equal to F or $CF_3$;
E and E', equal to or different from each other, are as defined above;
q', r' and s' are integers and can also have the 0 value and such that the product viscosity is as defined above.
These products are obtainable by photooxidation of a mixture of $C_3F_6$ and $C_2F_4$ and subsequent treatment with fluorine, as described in U.S. Pat. No. 3,665,041;

$$E-O-(C_2F_4O)_{t'}(CF_2O)_{u'}-E' \quad (5a)$$

wherein
E and E', equal to or different from each other, are as defined above;
t' and u' are integers such that the t'/u' ratio is between 0.1 and 5 and the product viscosity is as defined above.
These products are obtained by $C_2F_4$ photooxidation, as reported in U.S. Pat. No. 3,715,378, and subsequent treatment with fluorine, as described in U.S. Pat. No. 3,665,041;

$$E-O-(CF_2CF_2CF_2O)_{v'}-E' \quad (6a)$$

wherein
E and E', equal to or different from each other, are as defined above;
v' is a number such that the product viscosity is as defined above.
These products are obtained as described in EP 148,482;

$$D-O-(CF_2CF_2O)_{z'}-D' \quad (7a)$$

wherein
D and D', equal to or different from each other, are selected from $C_2F_5$ or $C_3F_7$, one fluorine atom of one or both the end groups can be substituted by Cl and/or H;
z' is an integer such that the product viscosity is as defined above.
These products can be obtained as reported in U.S. Pat. No. 4,523,039;

$$E_1-O(CF_2O)_n(CF_2CF_2O)_m(CF_2CF_2CF_2O)_p (CF_2CF_2CF_2CF_2O)_q-E_2 \quad (8a)$$

wherein
$E_1$ and $E_2$ are perfluoroalkyl end groups equal to or different from each other, having formula —$(CF_2)_zCF_3$ wherein z is an integer from 0 to 3;
n, m, p, q are integers equal to or different from each other between 0 and 100 and selected so that the oil viscosity is as defined above and such that the m/n ratio is between 2 and 20; (p+q)/(n+m+p+q) is between 0.05 and 0.2, n/(n+m+p+q) is between 0.05 and 0.40, (n+m+p+q) being different from 0.
These products can be obtained as described in EP 1,454,938.

Classes (1a), (4a), (5a), (8a) or their mixtures are preferred, classes (5a) and (8a) or their mixtures are more preferred.

The hydrogenated (non fluorinated) oils of component (ii) are preferably selected from mineral, paraffinic, aromatic oils, polyalphaolefins, alkyl esters, silicone esters, naphthalene derivatives, polyalkylated cycloalkanes, polyphenylethers.

Component (iii) is for example PTFE, talc, silica, boron nitride, polyurea, terephthalamate of alkaline or alkaline-earth metals, calcium and lithium soaps and their complexes. PTFE is preferred. The thickeners can be under the form of powders having a various particle sizes, in general of the range up to 20 micron, including having nano sizes (nano filler).

The lubricant compositions can optionally contain other additives, component (iv). These are, for example, antirust, antioxidants, thermal stabilizers, pour point depressants, antiwear for high pressures, antiwear, dispersants, tracers and dyestuffs. The thermal stabilizers, the antiwear, the antirust additives are those mentioned above.

The lubricating compositions contain (by weight):
(i) from 0.1% to 99.9%, preferably from 0.5% to 99.5%, more preferably from 2% to 98%, still more preferably from 5% to 95%;
(ii) 0-99.9%;
(iii) 0-50%;
(iv) 0-30%;
the sum of (i), (ii), (iii) and (iv) being 100%.

When the lubricant composition is formed of the components (i) and (ii), the ratio by weight (i)/((i)+(ii)) is preferably between 0.10 and 0.60 by weight. These compositions can be in the form of highly viscous oils or in the form of greases.

In case of highly viscous lubricant compositions, it is preferable to use component (i) with a higher viscosity than that of the component (ii). Optionally these lubricant compositions can also contain thickener (iii). The amount of component (iii) depends on the desired penetration degree of the grease. When additive (iv) is present its content is preferably up to 10% by weight, more preferably between 0.5% and 5%.

When the components of the lubricant are (i) and (iii), the ratio by weight (iii)/((iii)+(i)) is preferably between 0.02 and 0.4. In this case the compositions appear under the form of a grease. Optionally one or more additives (iv) can be added to these compositions.

The preferred lubricant compositions contain component (ii), more preferably as perfluoropolyether oil (PFPE). The show reduced friction coefficient and lower wear with respect to the oil (ii) when used as lubricant.

The lubricant compositions in the form of greases, show a reduced friction coefficient, lower wear and a low oil separation upon storage and a low evaporation loss.

When the component (ii) is a hydrogenated oil, component (i) preferably contains segments B, B' deriving from non fluorinated or partially hydrogenated olefins. In this case a lower oil separation is obtained. The greases have thermal rating higher than the basic hydrogenated oil (component (ii)).

The greases are prepared according to known techniques of the prior art. Preferably the following two processes are used: dry mixing and mixing with solvent.

In the dry mixing (A1) the component (i) is fed in a mixing machine in the desired amount, then the vacuum is made and it is heated to 150° C. After about two hours the components (ii) and/or (iii) are fed. Then heating is stopped and the composition is mixed for at least four hours. Then the vacuum is stopped and the grease is discharged. When components (iv) are used, they are added after component (i) and before components (ii) and (iii). The grease is refined for example by passage on a three-cylinder refiner.

In the mixing via solvent (B1), component (i) is fed in a mixer, then a fluorinated solvent with a low boiling point, preferably between 50° C. and 100° C., is added, preferably in an amount by weight as component (i). Then the composition is mixed generally for at least two hours. Then component (ii) and/or (iii) are fed and the mixing is continued for at least four hours. Then a vacuum is made in the mixer and the solvent is stripped out and recovered. When all the initial solvent is recovered, then the grease is left under mixing and under vacuum for one hour, then the vacuum is taken off and the grease discharged. When additives (iv) are used, these are added together with component (i). The grease is refined as indicated in the other method.

The solvents usable in the process (B1) are (per)fluoropolyethers having a low molecular weight, commercially known as Galden® and H-Galden®, perfluoroalkanes, as for example perfluorohexane or perfluoroheptane, hydrofluoroethers, etc.

The liquid lubricants are prepared by mixing the components.

Tests carried out by the Applicant have shown that the greases of the prior art comprising perfluoropolyether oils and PTFE as a thickening agent show wear and friction coefficients higher than those of the greases of the present invention, the penetration being the same.

The lubricant compositions (i)+(ii) do not show oil separation and therefore they are more stable at storage compared with the above prior art greases. The lubricant compositions furthermore show a lower evaporation oil loss compared to the oil.

The lubricating compositions when formed by component (i) and (ii), can be homogeneously dispersed or dissolved in solvent in concentrations between 0.1% and 30% by weight, preferably between 0.5% and 10%, still more preferably between 1% and 5%. The lubricating coating is obtained by using the techniques indicated above.

The lubricant compositions can be used in a wide temperature range from −90° C. to 250° C., in particular from −40° C. to 150° C., in several applications, for example in the car, mechanical and precision electronic industry, microgears and/or microbearings, or electric contacts, and also for plastic and/or elastomeric material.

The results obtained by lubricant compositions of the present invention are unexpected and surprising. In fact fluorinated oils have a very good viscosity behaviour with respect to the temperature showing very wide operating intervals between −90° C. and +290° C. depending on the structure of the oil. On the market perfluoropolyether oils having viscosity at 20° C. between 20 and about 3,000 cSt are available. For example linear chain perfluoropolyethers as Fomblin® Z and M have Tg generally around −130° C., a maximum viscosity of 1,300 cSt at 20° C. The disadvantage of these oils is that the wear values increase as the viscosity increases. The branched chain perfluoropolyethers, for example Fomblin® Y, show higher viscosities up to 1,800 cSt (at 20° C.) and a Tg higher than that of the linear oils Fomblin® Z, around −65° C.

In the patent application US 2005/0075250 lubricating compositions based on perfluoropolyether oils particularly suitable for high rate bearings having improved wear are described. The greases are obtained by using, as thickener, PTFE having average primary particles size of about 50 nm. They show good wear values, however show a high oil separation. As the amount by weight of PTFE decreases, a progressive increase of the oil separation is noticed. This is disadvantageous at the storage since it requires the use of a premixing before using the grease.

EP 501,533 describes fluorinated greases without the use of a powder thickener. The polymers exemplified have a molecular weight not higher than 6,200. A disadvantage of these lubricants is that they suffer from a high evaporation loss at high temperatures. Furthermore no friction coefficient is reported. To increase the molecular weight, one could increase the length of the perfluoropolyether block A and/or of the olefinic block B. In case the perfluoropolyether block A is longer, the disadvantage of the corresponding lubricant is that the wear is increased. When the length of B is increased, the polymer has a high crystallinity and high wear. Tests carried out by the Applicant have shown that block polymers having a high crystallinity, when used to prepare greases, show high wear. See the examples.

The following examples are illustrative but not limitative of the scope of the invention.

EXAMPLES

Characterization

The methods used to characterize the compound I) are the following.

NMR

The NMR spectra have been recorded by using a Variant Mercury 200 MHz spectrometer by using $CFCl_3$ as internal reference for the $^{19}F$-NMR analyses and tetra-methylsilane (TMS) as reference for the $^{1}H$-NMR analyses. Hexafluorobenzene is also used as solvent for the sample. The NMR measurement allows to determine the number average length of the polyolefinic block B, B', the z, z' indexes and the number average molecular weight of the compound of formula (I).

DSC

The thermal transitions, as Tg and melting temperature, have been determined with the Perkin Elmer® DSC-2C instrument by using the following procedure: cooling from 20° C. to −170° C. at 80° C. $min^{-1}$ and heating at 20° C. $min^{-1}$ from −170° C. to 350° C. under nitrogen flow.

Determination of the Residual Acidity

The acidity has been determined by potentiometric titration with Mettler-Toledo DL-55 titrer, equipped with DG 115-SC type electrode, by using as solvent the mixture water-acetone (1/3 v/v) and the aqueous solution NaOH 0,01 M as titrating agent. The sensitivity limit for the acidity determination (carboxylic acid end groups and HF) is equal to 0.5 meq $kg^{-1}$.

Determination Peroxidic Content (PO)

The analysis of the peroxide content has been carried out by iodometric titration, according to the following method. A weighed amount of sample (some grams) is dissolved in about 20 ml of Galden® ZT130. 1 ml of glacial acetic acid and 30 ml of a sodium iodide solution at 5% w/w in isopropylic alcohol are added. The resulting suspension is left under stirring for 15 minutes and the iodine developed from the reaction with the peroxide is titred with an aqueous solution of sodium thiosulphate having a known titre, by using the Mettler® DL 40 device for the potentiometric titration, equipped with platinum electrode and reference electrode. The sensitivity limit for the PO determination is 0.0002.

Determination of the Wear

For the wear evaluation the Four-ball Wear Test has been carried out according to the ASTM D 4172 standards by using a load of 40 $kg_f$ at a test temperature of 75° C. for a duration of one hour.

Determination of the Kinematic Viscosity

The kinematic viscosity at a given temperature has been determined by using capillary viscosimeters of the Cannon-Fenske type in accordance with the ASTM D445 method.

Weight Loss at Evaporation

The test is carried out according to the ASTM 2595 standard at 204° C. for 22 hours.

Penetration

The test is carried out according to the ASTM D 217 and D 1403 standards (micropenetration).

Determination of the Wear by Means of the Four-Ball Wear Test

For the wear evaluation of the compositions the ASTM D 2266 and D 4172 standards have been followed by using a load of 40 $kg_f$ at a test temperature of 75° C. for a duration of one hour.

Friction Evaluation Test for Ball Bearings

One ball bearing (SKF 6303 model), cleaned with n-hexane and dried, is filled at 30% by weight, with respect to the grease weight required for the full filling, with the grease to be tested and suitable shields are inserted to avoid the coming out of material. The so assembled bearing is mounted on a shaft, connected to an engine, equipped with suitable housing cup and shut. The cup where the bearing is housed is equipped with a load cell allowing to measure the bearing stress during the running. In the external bearing race a thermocouple detecting the temperature evolution during the test is placed. The test is carried out by setting a rate gradient from 0 to 16,000 rpm with step of 2,000 rpm, each lasting 1 hour. The test duration is of eight hours in all and the stress value after 1 hour at 16,000 rpm and the maximum temperature reached by the bearing are evaluated.

Determination of the Oil Separation for Long Times

The oil separation from the lubricating composition has been determined by following the procedure described in the FTMS 791-321 method at 50° C. for 7 days.

Loss by Weight at Evaporation

The test is carried out according to the ASTM 2575 standard for 22 hours at 204° C.

Determination of the Kinematic Viscosity

The kinematic viscosity at a given temperature has been determined by using capillary viscosimeters of the Cannon-Fenske type according to the ASTM D445 method.

Determination of the Friction Coefficient by SRV

It has been evaluated by means of the SRV equipment by Optimol GmbH under oscillatory conditions and by using as configuration the ball on disc under the following operating conditions:

| | |
|---|---|
| applied load | 100 N |
| oscillation amplitude | 1 mm |
| oscillation frequency | 50 Hz |
| temperature | 50° C. |
| test duration | 2 hours |

The friction coefficient has been evaluated as an average of the values obtained during two hours removing the first 200 sec.

Preparation of the Polymers of Formula (I)

Example 1

Preparation of the Polymer of Formula (I) Containing Segments from TFE with Batch Thermal Process In a 1 liter glass flask, equipped with probe for the temperature, mechanical stirring, bubbling inlet for the adduction of nitrogen and/or tetrafluoroethylene, 600 g of Galden® HT230, and 300 g of a peroxidic perfluoropolyether of class (A) of formula:

$$Xo\text{-}O(CF_2CF_2O)_r(CF_2O)_s(O)_t\text{-}Xo'$$

are introduced, wherein Xo and Xo' are: —$CF_3$ (29%), —$CF_2Cl$ (13%), —$CF_2CF_2Cl$ (20%), —COF (24%), —$CF_2COF$ (14%); with number average molecular weight equal to 5,8·10$^4$, r/s=1.25 and t/(r+s)=0.077 and having a PO equal to 1.3 [defined as g of active oxygen (molecular weight (MW)=16)/100 g of perfluoropolyether peroxide].

The reaction mixture is heated under stirring and under nitrogen flow (1 NI h$^{-1}$) up to 190° C., temperature at which the nitrogen feed is stopped and the feed of tetrafluoroethylene (TFE) starts with a flow-rate equal to 4.0 NI h$^{-1}$.

The mixture is maintained under stirring at 190° C. for 1.5 hours, then brought to 200° C. and maintained at this temperature for 1.5 hours and, lastly, increased to 210° C. for one hour.

The ratio between the TFE moles and the moles of peroxidic units fed is equal to 3.3.

The TFE feeding is interrupted, that of nitrogen opens (1 NI h$^{-1}$) and the temperature is raised up to 230° C. and maintained constant for 3 hours.

At the end of the thermal treatment the mixture is let cool down to room temperature. The mixture results to be an homogeneous solution which does not separate in the time.

In the reaction mixture, maintained under stirring at 180° C., nitrogen saturated with water (10 NI h$^{-1}$) is bubbled for 4 hours, at the end of which a treatment with anhydrous nitrogen (10 NI h$^{-1}$) is carried out for 30 minutes before passing to the treatment with fluorine (4 NI h$^{-1}$ for a total of 7 hours, T=170° C.) always under stirring. At the end of the fluorination, nitrogen (10 NI h$^{-1}$) is fed for 30 minutes for degassing the equipment.

An aliquot of the mixture is drawn and subjected to acidity measurement, which results lower than the sensitivity limit of the method.

By distillation under vacuum at 10$^{-1}$ mbar (maximum T in kier=230° C.) the solvent Galden® HT230 is removed, obtaining 305 g of product which is characterized by $^{19}$F-NMR analysis, confirming the following structure:

$$T\text{-}O\text{-}[A\text{-}B]_z\text{-}A\text{-}T' \qquad (I)$$

wherein

T, T' are for about 70% molar formed of $CF_3$, while the remaining part is $CF_2Cl$, $CF_2CF_2Cl$;

B is —$[CF_2—CF_2]_j$ wherein j has a number average value equal to 4.0 wherefore the number average length of the segment B is of 8.0 carbon atoms;

$$A=\!\!-\!(CF_2)O\!-\![(CF_2O)_n(CF_2CF_2O)_m(CF_2CF_2CF_2O)_p (CF_2CF_2CF_2CF_2O)_q\!-\!](CF_2)_b\!\!-$$

with values of m/n=1.08, p/n=0.014, q/n=0.020; (p+q)/(p+q+n+m)=0.016, wherein b=0 when A is linked to T', b=1 in all the other cases, wherein the units ($CF_2CF_2CF_2O$) and ($CF_2CF_2CF_2CF_2O$) are assumed as generated from the recombination of alkyl radicals formed during the decomposition of the peroxidic units since the total amount of said unit is substantially similar to that generated during the thermal treatment of the peroxidic perfluoropolyether (PFPE) in the absence of olefins.

The percentage by weight of the perfluorocarbon segments B in the compound of formula (I) is equal to 13.5%. The number average molecular weight of the polymer results equal to 5.9·10$^4$, from which an average value of the index z=20 is calculated.

The DSC analysis shows a Tg equal to −113° C. and does not show any melting peak around 320° C. typical of PTFE or of high length TFE segments.

Example 2 (Comparative)

By following the method of the Example 1 a block polymer was prepared having a total content of TFE similar to that of the Example 1 but having longer blocks B.

The amount by weight of peroxidic perfluoropolyether and solvent, the TFE flow-rates and the heating conditions are equal to those reported in the Example 1 but a peroxidic perfluoropolyether of formula:

$$Xo\text{-}O(CF_2CF_2O)_r(CF_2O)_s(O)_t\text{-}Xo'$$

was used, wherein Xo and Xo' are: —$CF_3$ (34%), —$CF_2Cl$ (11%), —$CF_2CF_2Cl$ (21%), —COF (12%), —$CF_2COF$ (22%); with number average molecular weight=5.7·10$^4$, r/s=1.24 and t/(r+s)=0.0075 and having a PO equal to 0.13.

The ratio between the TFE moles and the moles of peroxidic bonds (peroxidic units) fed is equal to 33 (out of the range of the present invention).

At the end of the test the reaction mixture is heated under nitrogen (1 NI h$^{-1}$) to 230° C. for 3 hours, then it is let cool at room temperature.

Then the mixture is treated with nitrogen saturated with water (10 NI h$^{-1}$) at 180° C. for 4 hours and then with 10 NI h$^{-1}$ of anhydrous nitrogen for 30 minutes always at the same temperature. Lastly a fluorination with elementary fluorine (4 NI h$^{-1}$) at 170° C. is carried out for 7 hours. The final acidity results lower than the sensitivity limit of the analytical method.

By distillation under vacuum the solvent Galden® HT230 is removed (kier T max: 230° C. at 10$^{-1}$ mbar) and 295 g of solid product insoluble in hexafluorobenzene and in all the perfluorinated solvents are obtained.

From the mass balances on the TFE a total TFE content equal to 13.0% is determined in the polymer of formula (I): as a matter of fact, the amount of decomposed peroxidic bonds being known (difference of initial and final PO after step a)) and the TFE amount inserted (reacted) being known, it is possible to calculate the average length of the TFE segments, which in this case results equal to 29 carbon atoms.

The DSC analysis shows a glass transition at −115° C. and a melting temperature around 322° C., confirming the presence of high length TFE blocks B.

From the comparison of the data of the Example 1 with those of the Example 2, it is noticed that, even though the total TFE content is equal, the two polymers result to have different chemico-physical characteristics, as solubility in fluorinated solvent and melting temperature, due to the different length of the TFE blocks B.

Example 3 (Comparative)

The Example 1 was exactly repeated except that the TFE flow-rate was increased to 33.0 NI h$^{-1}$, such as to have a ratio between the TFE moles and the moles of peroxidic bonds fed equal to 27 (out of the range of the process of the present invention).

During the reaction it is noticed that the product tends to separate from the solvent remaining in the form of dispersion.

The reaction mixture is treated with nitrogen saturated with water (10 NI h$^{-1}$) at 220° C. for 10 hours and, then with 10 NI h$^{-1}$ of anhydrous nitrogen for 30 minutes always at the same temperature. Then a fluorination treatment with elementary fluorine (5 NI h$^{-1}$) at 180° C. is carried out for 5 hours. The final acidity results lower than the sensitivity limit of the analytical method.

By distillation under vacuum the solvent Galden® HT230 is removed (kier T max: 230° C. at 10$^{-1}$ mbar) and 420 g of solid product insoluble in any (per)fluorinated solvents are obtained.

From the inlet and outlet TFE mass balances (gaschromatographic analysis) a total content of TFE units is evaluated equal to 55% by weight of the copolymer: the amount of decomposed peroxidic bonds being known (difference of initial and final PO after step a)) and the TFE amount inserted (reacted) being known, it is possible to calculate the average length of the blocks B, which in this case results equal to 27 carbon atoms.

The DSC analysis shows a glass transition at −113° C. and a melting peak around 320° C., value near the melting temperature of the TFE (PTFE) homopolymer.

From the comparison of the data of the Examples 1 and 2 with those of the Example 3, it is noticed that the obtained polymers result to have different chemico-physical characteristics, as solubility and melting temperature, due to the different length of the TFE blocks B.

Example 3A

Preparation of the Polymer (I) Containing Blocks Deriving from TFE-Ethylene by Thermal Process In a 1,000 ml glass flask equipped with mechanical stirring, temperature sonde, bubbling inlet and outlet for gases, a solution is fed formed of 360 g of perfluoropolyether peroxide of formula Xo-O(CF$_2$CF$_2$O)$_r$(CF$_2$O)$_s$(O)$_t$-Xo' wherein Xo and Xo' are —CF$_3$ (24%), —CF$_2$Cl (12%), —CF$_2$CF$_2$Cl (10%), —COF (17%), —CF$_2$COF (37%) with number average molecular weight Mn=3.9·10$^5$; r/s=1.12 and t/(r+s)=0.088 and having a PO=1.5%;

1,080 g of Galden® HT230.

Under nitrogen flow the flask is heated up to 190° C. When this temperature is reached, the nitrogen is closed and a mixture of tetrafluoroethylene (14.4 NI h$^{-1}$) and ethylene (10.8 NI h$^{-1}$) is fed.

The flask temperature is maintained at 190° C. for 1.5 hours, then brought to 200° C. for 1.5 hours and then brought to 210° C. and maintained for 1.0 hours.

The ratio between the moles of olefins fed (TFE and ethylene) and the moles of peroxidic bonds fed in the reactor is equal to 15.

At the end of the test the acid end groups of the reaction product are salified with a stoichiometric amount of ammonium hydroxide (aqueous solution at 32%).

The product is then fed inside a reactor together with 750 g of water and subjected to the decarboxylation reaction at 130° C. for 10 hours as described in EP 695,775.

At the end of the test the acidity results lower than the sensitivity limit of the analytical method.

The reaction product is recovered by separation and then distilled under vacuum to remove the solvent Galden® HT230. 340 g of product are obtained which results to have the following structure:

T-C-[A-B]$_z$-A-T'         (I)

wherein

T, T' are formed for about 45% of —CF$_3$, —CF$_2$Cl and —CF$_2$CF$_2$Cl and for the remaining 55% of —CF$_2$H end groups and traces of —CF$_2$CF$_2$H end groups;

B is —[(CF$_2$CF$_2$)$_j$(CH$_2$CH$_2$)$_{j'}$]— wherein the average value of j+j' is equal to 4.6 and the average value of j/j' is equal to 2.7;

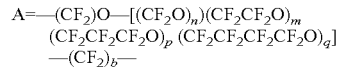

with values of m/n=0.95, p/n=0.009, q/n=0.014; (p+q)/(p+q+n+m)=0.012, wherein b=0 when A is linked to T', b=1 in all the other cases, wherein the (CF$_2$CF$_2$CF$_2$O) and (CF$_2$CF$_2$CF$_2$CF$_2$O) units are assumed as generated from the recombination of alkyl radicals formed during the decomposition of the peroxidic bonds for the same reasons previously described.

The number average molecular weight of (I) is 3,8·10$^4$, the content of blocks B is equal to 14% by weight of the polymer total and the number average value of the z index is equal to 14.

On the product the DSC analysis is carried out showing a glass transition at −110° C.

Example 4

The test is carried out according to the procedure reported in the Example 1.

The amounts of the reactants and the operating conditions are similar, except for the TFE flow-rate, which results equal to 2.0 NI h$^{-1}$. The ratio between the TFE and the moles of peroxidic bonds fed is equal to 1.7.

At the end of the thermal treatment the mixture is let cool down to room temperature; the mixture results to be an homogeneous and transparent solution.

In the reaction mixture, maintained under stirring at 180° C., nitrogen saturated with water (10 NI h$^{-1}$) is bubbled for 4 hours, at the end of which a treatment with anhydrous nitrogen (10 NI h$^{-1}$) is carried out for 30 minutes before passing to the treatment with elementary fluorine (4 NI h$^{-1}$ for a total of 6 hours, T=160° C.) always under stirring. At the end of the fluorination nitrogen (10 NI h$^{-1}$) is fed for 30 minutes for degassing the equipment.

An aliquot of the mixture is taken and subjected to acidity measurement by potentiometric titration: it results a value lower than the sensitivity limit of the method (0.5 meq kg$^{-1}$).

By vacuum distillation with diffusive pump) (maximum kier T=230° C. at 10$^{-1}$ mbar) the solvent Galden® HT230 is removed.

268 g of a product are obtained which is characterised by $^{19}$F-NMR analysis.

The structure is the following:

T-O-[A-B]$_z$-A-T' wherein

T, T' are for about 70% molar formed of CF$_3$, while the remainder is CF$_2$Cl, CF$_2$CF$_2$Cl;

B is [CF$_2$CF$_2$]$_j$— wherein j has a number average value equal to 3.0 wherefore the number average length of the segment B is 6.0 carbon atoms;

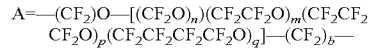

with values of m/n=1.06, p/n=0.018 and q/n=0.019; (p+q)/(p+q+n+m)=0.018, wherein b=0 when A is linked to T', b=1 in all the other cases, wherein the units (CF$_2$CF$_2$CF$_2$O) and (CF$_2$CF$_2$CF$_2$CF$_2$O) are taken as generated from the recombination of alkyl radicals formed during the decomposition of the peroxidic bonds for the same reasons mentioned in the previous examples.

The percentage by weight of the blocks B in the polymer of formula (I) is equal to 11.1%.

The end groups T and T' are —$CF_3$ and –$CF_2CF_3$ and the polymer number average molecular weight results equal to $5.2 \cdot 10^4$, from which an average value of the index z=19 is calculated.

The DSC analysis shows the glass transition typical of the perfluoropolyether structure at –113° C. Transitions at higher temperatures are not observed.

The obtained product is characterised, in kinematic viscosity terms, by capillary viscosimeter. At 40° C. the viscosity is 9,000 cSt, corresponding to about 30,000 cSt at 20° C.

Example 5

Preparation of the Polymer of Formula (I) Containing Segments from TFE with Continuous Thermal Process The synthesis is carried out in a continuous way in a 250 ml glass flask equipped with mechanical stirring, dropping funnel, bubbling inlet for the gas feeding, temperature sonde, outlet for the continuous drawing of the reaction product.

200 g of fluorinated solvent Galden® HT230 are fed into the reaction flask and the mixture is gradually heated under stirring and under nitrogen flow up to 230° C., temperature at which the nitrogen is stopped and 6.0 Nl $h^{-1}$ of TFE are fed.

Contemporaneously a solution of Galden® HT230 at 20% w/w of a peroxidic perfluoropolyether is fed in the flask, of formula $$Xo\text{-}O(CF_2CF_2O)_r(CF_2O)_s(O)_t\text{-}Xo'$$

wherein Xo and Xo' are: —$CF_3$ (28%), —$CF_2Cl$ (18%), —$CF_2CF_2Cl$ (15%), —COF (10%), —$CF_2COF$ (29%); r/s=1.20 and t/(r+s)=0.068, with number average molecular weight Mn=$5.5 \cdot 10^4$ and having a PO=1.15, with a constant flow-rate equal to 200 g $h^{-1}$.

The ratio between the TFE moles and the moles of peroxidic bonds fed is equal to 9. (Moles of peroxidic bonds=g of sample·PO/(100·16)).

The average residence time in the reactor is 1 hour. The reaction conditions (temperature, feeding, stirring rate) are maintained constant for the whole duration of the test.

The reaction mixture containing the product is continuously extracted from the reaction flask and collected in fractions separated at regular intervals of 1 hour the one from the other and analyzed. After 22 hours of reaction the TFE and peroxidic solution feeding is stopped, the nitrogen is opened and it is let cool.

The fractions collected between the first and the seventh hour are discarded as they have not the same composition (transitory).

The fractions collected after the eighth hour result to have a constant composition (steady conditions) and are joined in a glass flask and heated, under mechanical stirring and under nitrogen flow, at 230° C. for 3 hours.

At the end it is let cool down to 200° C. and 10 Nl $h^{-1}$ of nitrogen saturated with water are firstly fed for 6 hours to convert the acylfluoride end groups into –COOH end groups; then 10 Nl $h^{-1}$ of anhydrous nitrogen are fed for 30 minutes.

The reaction mixture is then subjected to fluorination with elementary fluorine (5 Nl $h^{-1}$) at 180° C. for 5 hours. The final acidity results lower than the sensitivity limit of the analytical method.

By vacuum distillation (kier T max: 230° C. at $10^{-1}$ mbar) the solvent Galden® HT230 is removed and 600 g of product are recovered.

An aliquot of the sample is dissolved in hexafluo-robenzene and analysed by $^{19}$F-NMR analysis, confirming the structure of the block copolymer:

$$T\text{-}O\text{-}[A\text{-}B]_z\text{-}A\text{-}T' \quad (I)$$

wherein

T, T' are for about 70% molar formed of $CF_3$, while the remaining part is $CF_2Cl$, $CF_2CF_2Cl$, B is —$[CF_2$—$CF_2]_j$ wherein j has a number average value equal to 3.9 wherefore the number average length of the segment B is 7.8 carbon atoms;

$$A=\text{—}(CF_2)O\text{—}[(CF_2O)_n)(CF_2CF_2O)_m(CF_2CF_2CF_2O)_p(CF_2CF_2CF_2CF_2O)_q]\text{—}(CF_2)_b\text{—}$$

wherein m/n=1.08; p/n=0.019; q/n=0.019; (p+q)/(p+q+n+m)=0.018, wherein b=0 when A is linked to T', b=1 in all the other cases, wherein the units ($CF_2CF_2CF_2O$) and ($CF_2CF_2CF_2CF_2O$) are assumed as generated from the recombination of alkyl radicals formed during the decomposition of the peroxidic bonds as the total amount of said unit is substantially equal to that generated during the thermal treatment of the peroxidic PFPE in the absence of olefins;

the number average molecular weight of the polymer of formula (I) is equal to $5.5 \cdot 10^4$.

The total content of the TFE units is 15% by weight.

From the above reported data it is possible to calculate the average number of the segments B in the polymer of formula (I) and thus the index z, which is equal to 21.

The DSC analysis shows a Tg equal to –114° C. and does not show any melting peak around 320° C. typical of the PTFE or of high length TFE segments.

Example 6

The Example 1 is repeated but using a peroxidic perfluoropolyether having the same PO but different structure:

$$X1\text{-}O(CF_2CF_2O)_r(CF_2O)_s(CF(CF_3)O)_u(CF_2CF(CF_3)O)_v(O)_t\text{—}X1'$$

wherein

X1 and X1' are —$CF_3$ for 59% by moles and for the remaining 41% are —$CF(CF_3)COF$, —COF;

v/r=0.35, (s+u)/(r+v)=0.096 and t=6.8 and having a number average molecular weight equal to $8.3 \cdot 10^3$ and PO=1.3;

the amounts of peroxide, of solvent (Galden® HT230), of TFE and the reaction conditions are equal to those used in the Example 1.

At the end of the synthesis the reaction mixture is let cool down to room temperature. The reaction mixture is an homogeneous solution which does not separate in the time. It is subjected to the neutralization process by following the same conditions reported in the example 1. At the end of the neutralization the mixture acidity results lower than the analytical limit.

By vacuum distillation the solvent is removed obtaining 290 g of polymer having the following structure:

$$T\text{-}O\text{-}[A\text{-}B]_z\text{-}A\text{-}T'$$

wherein

T, T' are for about 64% molar formed of $CF_3$, while the remaining part is $C_2F_5$;

B is —$[CF_2CF_2]_j$— wherein j has a number average value equal to 3.7 wherefore the number average length of the segment B is 7.4 carbon atoms;

$$A=(CF_2)O[(CF_2O)_n(CF_2CF_2O)_m(CF_2CF_2CF_2O)_p(CF_2CF_2CF_2CF_2O)_q(CF(CF_3)O)_u(CF_2CF(CF_3)O)_v]\text{—}(CF_2)_b\text{—}$$

wherein v/m=0.34, (n+u)/(m+v)=0.097,
wherein b=0 when A is linked to T', b=1 in all the other cases,
wherein the units $(CF_2CF_2CF_2O)$ and $(CF_2CF_2CF_2CF_2O)$ are assumed as generated from the recombination of alkyl radicals formed during the decomposition of peroxidic bonds as the total amount of said units is substantially equal to that generated during the thermal treatment of the peroxide in absence of olefins.

The number average molecular weight of the polymer of formula (I) is equal to $7.9 \cdot 10^3$.

The content of the blocks B on the total weight of the polymer is 10.8% by weight and z=2.3.

Example 7

Preparation of the Polymer of Formula (I) Containing Blocks B Deriving from TFE-PFP by Thermal Process In a 100 ml glass flask equipped with mechanical stirring, temperature sonde, bubbling inlet and outlet for gases, a solution is fed formed of 20 g of peroxidic perfluoropolyether of formula

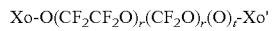
Xo-O(CF$_2$CF$_2$O)$_r$(CF$_2$O)$_s$(O)$_t$-Xo' wherein Xo and Xo' are: —CF$_3$ (24%), —CF$_2$Cl (12%), —CF$_2$CF$_2$Cl (10%), —COF (17%), —CF$_2$COF (37%), with number average molecular weight Mn=$3.9 \cdot 10^4$, r/s=1.12 and t/(r+s)=0.088 and having a PO=1.5 and of 60 g of Galden® HT230.

Under nitrogen flow the flask is heated up to 190° C. When this temperature has been reached, the nitrogen is stopped and a mixture of TFE (0.30 Nl h$^{-1}$) and of perfluoropropene (PFP) (1.1 Nl h$^{-1}$) is fed.

The flask temperature is maintained at 190° C. for 1.5 hours, then brought to 200° C. and maintained for 1.5 hours and lastly brought to 210° C. and maintained for 1.0 hours.

The ratio between the total moles of fed olefins (TFE and PFP) and the moles of peroxidic bonds fed is equal to 15.

At the end of the test the reaction mixture is heated under nitrogen (1 Nl/h) at 230° C. for 3 hours, then let cool at room temperature. Then the mixture is treated with nitrogen saturated with water (1 Nl/h) at 180° C. for 4 hours and then with 2 Nl/h of anhydrous nitrogen for 30 minutes always at the same temperature.

Lastly the fluorination is carried out with elementary fluorine (1 Nl/h) at 170° C. for seven hours.

The final acidity results lower than the sensitivity limit of the method.

The solvent is then removed by distillation under vacuum (kier T max: 230° C. at 10$^{-1}$ mbar). 20.3 g of product are obtained, which, analysed by $^{19}$F-NMR, results to have the following alternated block structure:

T-C-[A-B]$_z$-A-T'     (I)

wherein
T, T' are for about 80% formed of —CF$_3$ end groups, while the remaining part is —CF$_2$Cl, —CF$_2$CF$_2$Cl,
B is —[(CF$_2$—CF$_2$)$_j$(CF$_2$CF(CF$_3$))$_{j'}$]— wherein the average value of (j+j') is 4.45 and the average value of j/j' is equal to 1.9,

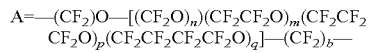
A=—(CF$_2$)O—[(CF$_2$O)$_n$)(CF$_2$CF$_2$O)$_m$(CF$_2$CF$_2$CF$_2$O)$_p$(CF$_2$CF$_2$CF$_2$CF$_2$O)$_q$]—(CF$_2$)$_b$— with values of m/n=0.98, p/n=0.014, q/n=0.020, (p+q)/(p+q+n+m)=0.017, wherein b=0 when A is linked to T', b=1 in all the other cases,
wherein the units $(CF_2CF_2CF_2O)$ and $(CF_2CF_2CF_2CF_2O)$ are assumed as generated from the recombination of alkyl radicals formed during the decomposition of the peroxidic bonds for the reasons previously described.

The number average molecular weight of the polymer of formula (I) is $4.0 \cdot 10^4$, the percentage by weight of the blocks B is 21% by weight on the total weight of the polymer and the number average value of the index z is equal to 11.

The DSC analysis shows a glass transition temperature (Tg) of −107° C. typical of the perfluoropolyether structure. No transitions at higher temperatures are observed.

Example 8

Preparation of the Polymer of Formula (I) Containing Blocks B Deriving from TFE-Ethylene by Thermal Process The test is carried out by following the procedure described in the example 7 by feeding TFE (0.7 Nl h$^{-1}$) and ethylene (0.7 Nl h$^{-1}$).

The ratio between the total moles of fed olefin (TFE and ethylene) and the moles of peroxidic bonds of the peroxide fed is equal to 15.

At the end of the test the reaction solvent is removed by distillation under vacuum (kier max T: 200° C. at 10$^{-1}$ mbar).

The acid end groups of the reaction product are salified with a stoichiometric amount of ammonium hydroxide (aqueous solution at 32%). The salt is then fed inside an autoclave together with 40 g of water and subjected to the decarboxylation reaction at 130° C. for 10 hours, according to what described in EP 695,775. At the end of the test an aliquot of the product is taken and subjected to the acidity analysis, which results lower than the sensitivity limit. The reaction product is recovered by separation and anhydrified by heating under vacuum at 50° C.

20.6 g of product are obtained, which, analyzed by $^{19}$F-NMR, confirms the following block structure:

T-O-[A-B]$_z$-A-T'     (I)

wherein
T, T' are formed of about 45% of end groups —CF$_3$, —CF$_2$Cl, CF$_2$CF$_2$Cl and for the remaining 55% of end groups —CF$_2$H and traces of end groups —CF$_2$CF$_2$H,
B is —[(CF$_2$—CF$_2$)$_j$(CH$_2$CH$_2$)$_{j'}$]— wherein the average value of (j+j') is 4.5 and the average value j/j' is equal to 2.3,

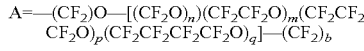
A=—(CF$_2$)O—[(CF$_2$O)$_n$)(CF$_2$CF$_2$O)$_m$(CF$_2$CF$_2$CF$_2$O)$_p$(CF$_2$CF$_2$CF$_2$CF$_2$O)$_q$]—(CF$_2$)$_b$ with values of m/n=0.95, p/n=0.009, q/n=0.014; (p+q)/(p+q+n+m)=0.012,
wherein b=0 when A is linked to T', b=1 in all the other cases,
wherein the units $(CF_2CF_2CF_2O)$ and $(CF_2CF_2CF_2CF_2O)$ are assumed as generated from the recombination of alkyl radicals formed during the decomposition of the peroxidic bonds for the same reasons previously described.

The number average molecular weight of the polymer of formula (I) is $4.0 \cdot 10^4$, the percentage by weight of the blocks B is 11% and the number average value of the index z is equal to 12.

On the product the DSC analysis is then carried out, which shows a single glass transition at −108° C.

Example 9

Preparation of the Polymer of Formula (I) Containing Segments from Ethylene by Thermal Process The test is carried out by following the procedure described in the example 7 by feeding ethylene (0.7 Nl h$^{-1}$) as olefin for the insertion. The ratio between the ethylene moles and the moles of peroxidic bonds fed is equal to 7.

At the end of the test the reaction solvent is removed by distillation under vacuum (kier T max: 200° C. at $10^{-1}$ mbar).

The acid end groups of the reaction product are salified with a stoichiometric amount of ammonium hydroxide (aqueous solution at 32%). The salt is then fed inside an autoclave together with 40 g of water and subjected to the decarboxylation reaction at 130° C. for 10 hours according to what described in EP 695,775. At the end of the test an aliquot of the product is taken and subjected to acidity analysis, which results lower than the sensitivity limit. The reaction product is recovered by separation and anhydrified by heating under vacuum at 50° C.

18.1 g of viscous liquid product are obtained which, analysed by $^{19}$F-NMR, confirms the following block structure:

wherein

T, T' are formed for about 45% of end groups —$CF_3$, —$CF_2Cl$, $CF_2CF_2Cl$ and for the remaining 55% of end groups —$CF_2H$ and traces of end groups —$CF_2CF_2H$, B is —$[CH_2—CH_2]_j$ wherein j has a number average value equal to 2.1 wherefore the number average length of the segment B is 4.2 carbon atoms;

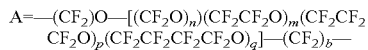

with values of m/n=0.97, p/n=0.014, q/n=0.005, (p+q)/(p+q+n+m)=0.010, wherein b=0 when A is linked to T', b=1 in all the other cases, wherein the units ($CF_2CF_2CF_2O$) and ($CF_2CF_2CF_2CF_2O$) are generated from the recombination of alkyl radicals formed during the decomposition of the peroxidic bonds.

The number average molecular weight is $3.5·10^4$. The parameter z is equal to 13. The percentage by weight of the ethylene blocks is 2% by weight on the total weight of the polymer.

The DSC analysis shows a single glass transition at −112° C.

Example 10

Preparation of the Polymer of Formula (I) Containing Blocks Deriving from VDF by Thermal Process The test is carried out by following the procedure described in the example 7, by feeding in a solution formed of 15 g of peroxidic perfluoropolyether (number average molecular weight (Mn) equal to $5.5·10^4$ and PO=1.17%) and of 135 g of Galden® HT230, the vinylidene fluoride (VDF) with a flow-rate equal to 0.4 NI $h^{-1}$.

The following heating program is followed: 165° C. for 1 hour, 170° C. for 2.5 hours, 180° C. for 1.5 hours, 185° C. for 1 hour, 190° C. for 1 hour, 200° C. for 0.5 hours and lastly 220° C. for 0.5 hours.

The ratio between the VDF moles fed and the moles of peroxidic bonds fed is equal to 14.

At the end of the test the reaction solvent is removed by distillation under vacuum (T max: 190° C. at $2.0·10^{-1}$ mbar).

The acid end groups of the reaction product are salified with a stoichiometric amount of ammonium hydroxide (aqueous solution at 32%). The salt is then fed inside an autoclave together with 40 g of water and subjected to the decarboxylation reaction at 130° C. for 10 hours according to what described in EP 695,775.

At the end of the test an aliquot of the product is taken and subjected to acidity analysis, which results lower than the sensitivity limit. The reaction product is recovered by separation and anhydrified by heating under vacuum at 50° C.

14.1 g of product are obtained which, analysed by $^{19}$F-NMR, confirms the following block structure:

wherein

T, T' are formed for about 45% of end groups —$CF_3$, —$CF_2Cl$, $CF_2CF_2Cl$ and for the remaining 55% of end groups —$CF_2H$ and traces of end groups —$CF_2CF_2H$;

B is —$[CF_2—CH_2]_j$ wherein j has a number average value equal to 4.5, whose number average length is 9 carbon atoms;

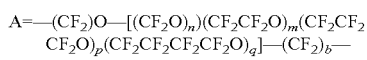

with values of m/n=0.97, p/n=0.014, q/n=0.005, (p+q)/(p+q+n+m)=0.0095, wherein b=0 when A is linked to T', b=1 in all the other cases, wherein the units ($CF_2CF_2CF_2O$) and ($CF_2CF_2CF_2CF_2O$) are generated from the recombination of alkyl radicals formed during the decomposition of the peroxidic bonds.

The number average molecular weight of the polymer of formula (I) is $5.2·10^4$, the percentage by weight of the blocks B is 10% on the total weight of the polymer and the number average value of the index z is equal to 18.

The DSC analysis shows a glass transition at −107° C.

Example 11

Preparation of the Polymer of Formula (I) Containing Blocks B Deriving from CTFE by Photochemical Process A solution formed of 15 g of peroxidic perfluoropolyether used in the example 7 and of 200 g of H-Galden® ZV 60 is fed inside a photochemical reactor (reaction volume=125 ml) equipped with 150 Watt UV lamp and with a magnetic stirring system.

Under nitrogen flow and under stirring the reactor is cooled down to −50° C., temperature at which 1.6 NI (8.3 g) of chlorotrifluoroethylene (CTFE) are condensed.

The ratio between the CTFE moles fed and the moles of peroxidic bonds fed is equal to 5.

The reaction mixture is left under stirring for 10 minutes, then the UV lamp is turned on by letting the temperature set at −20±5° C. These conditions are maintained constant for the whole duration of the reaction (6 hours). At the end the lamp is turned off and the mixture is let reach the room temperature.

H-Galden® ZV 60 is then distilled under atmospheric pressure and the reaction product is then diluted with 50 g of Galden® HT230 and subjected to thermal treatment at 230° C. for 5 hours in order to remove the residual peroxide. Then the mixture is treated with nitrogen saturated with water (1 NI/h) at 180° C. for 3 hours and then with 2 NI/h of anhydrous nitrogen for 30 minutes, always at the same temperature.

Lastly fluorination with elementary fluorine (1 NI/h) at 170° C. for 5 hours is carried out. The solvent is then removed by distillation under vacuum at 210° C. and $10^{-1}$ mbar.

13.1 g of product are obtained which, analysed by $^{19}$F-NMR, confirms the following block structure:

wherein

T, T' are formed of end groups —CF$_3$, —CF$_2$Cl, CF$_2$CF$_2$Cl,

B is [CF$_2$CFCl]$_j$ wherein the average value of j is equal to 4.5, whose number average length is of 9 carbon atoms;

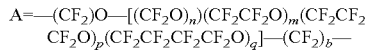

with values of m/n=0.94, p/n=0.002 and q/n=0.001, (p+q)/(p+q+n+m)=0.0015, wherein b=0 when A is linked to T', b=1 in all the other cases, wherein the units (CF$_2$CF$_2$CF$_2$O) and (CF$_2$CF$_2$CF$_2$CF$_2$O) are generated from the recombination of alkyl radicals formed during the decomposition of the peroxidic bonds.

The percentage by weight of the blocks B in the polymer of formula (I) is equal to 12.5% based on the total weight of the polymer, the number average molecular weight of the copolymer results equal to 3,5·10$^4$, from which an average value of the index z=8 is calculated.

The DSC analysis shows a glass transition at −105° C.

Example 12

Preparation of a Polymer of Formula (I) Containing Blocks B Deriving from TFE

The example 5 is repeated but using a TFE flow-rate equal to 13.0 Nl h$^{-1}$, such as to obtain blocks B having a length higher than 10. All the other synthesis conditions are maintained the same, therefore the ratio between the TFE moles and the moles of peroxidic bonds fed results equal to 18.

The fractions collected after the eighth hour (steady conditions) are joined and subjected to neutralization under the same conditions reported for the example 5. The final acidity is lower than the sensitivity limit of the analytical method.

By distillation under vacuum (kier maximum T: 230° C. at 10$^{-1}$ mbar) the solvent Galden® HT230 is removed and 645 g of polymer are recovered.

An aliquot of the sample is dissolved in hexafluo-robenzene and analysed by $^{19}$F-NMR, confirming the following structure:

wherein T, T' are for about 70% molar formed of CF$_3$, while the remaining part is CF$_2$Cl and CF$_2$CF$_2$Cl, B is —[CF$_2$CF$_2$]$_j$— wherein j has a number average value equal to 6.1 wherefore the number average length of the segment B is 12.2 carbon atoms,

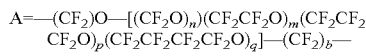

wherein m/n=1.08; p/n=0.019; q/n=0.019; (p+q)/(p+q+n+m)=0.018, wherein b=0 when A is linked to T', b=1 in all the other cases, wherein the units (CF$_2$CF$_2$CF$_2$O) and (CF$_2$CF$_2$CF$_2$CF$_2$O) are assumed as generated from the recombination of alkyl radicals formed during the decomposition of the peroxidic bonds as the total amount of said unit is substantially equal to that generated during the thermal treatment of the peroxide in the absence of olefins.

The number average molecular weight of the polymer of formula (I) is equal to 6.0·10$^4$.

The content by weight of the TFE blocks B is 22% based on the total weight of the polymer.

From the above reported data it is possible to calculate the average number of segments B in the polymer of formula (I) and thus the index z, which is equal to 22.

The DSC analysis shows a Tg at −113° C. No melting peaks around 320° C. typical of the PTFE or of the high length TFE segments are observed.

Application Tests: Wear and Loss at Evaporation Measurements

Example 13

The compound obtained from the example 4 is subjected to wear measurement and shows a value equal to 1.0 mm.

By comparison a wear measurement has been carried out on the Fomblin® M30 oil (number average molecular weight=9,800), with viscosity at 20° C. of 280 cSt, showing a value equal to 1.48 mm.

It results unexpected that an oil having a viscosity about 10 times higher than that of Fomblin® M30 shows a lower wear of about 30%. Example 14

The compound of the example 7, subjected to wear measurement, shows a value equal to 1.0 mm. Furthermore the compounds of the examples 1, 5, 6, 9, 10, 11 are subjected they too to wear measurement giving the following values (mm):

| example 1 | 1.05 |
| example 5 | 0.97 |
| example 6 | 0.90 |
| example 9 | 1.10 |
| example 10 | 0.98 |
| example 11 | 1.07 |

Example 15

The compound of the example 8, subjected to wear measurement, shows a value equal to 0.85 mm.

The wear data of the examples 13, 14 and 15 show that the products of the present invention, even showing a high molecular weight, show wear values lower than those of the commercial fluorinated oils having a lower molecular weight.

Example 16

The wear of the polymer obtained in the example 12 is measured, which results to be equal to 1.15. The same measurement is carried out on the perfluoropolyether oil Fomblin® M30, which results to have a wear equal to 1.48 mm.

From the comparison of the two results one deduces that, compared to the perfluoropolyether oils of Fomblin® Z type, the polymers of formula (I) but having an average length of the blocks B higher than 10 and lower than 20 result to have they too low wear values.

Furthermore the test of weight loss at evaporation is carried out: the polymer of the example 12 shows a loss lower than 0.01% while the weight loss at 204° C. for 24 hours of Fomblin® M30 results to be 0.7%.

Example 17 (Comparative)

The wear of the polymer obtained in the example 2 (comparative) and having blocks B of length equal to 29 carbon atoms is measured.

The sample does not show lubricating properties at the temperature at which the measurement is carried out (T=75° C. according to ASTM D4172B standard) and the wear quickly increases immediately after the beginning of the measurement and therefore the test is suspended.

Furthermore the wear of the polymer obtained in the example 3 (comparative) having blocks B of length equal to 27 carbon atoms is measured, substantially obtaining the same results of the polymer of the example 2.

From the comparison with the previous example one deduces that the polymers of formula (I) having lengths of B higher than 20 show wear values not measurable as extremely high and therefore they are not usable as lubricants.

Example 18

The polymer of formula (I) obtained in the example 4 and having a wear of 1.0 mm is subjected to the weight loss test by evaporation. After 22 hours at 204° C. the weight loss results to be lower than 0.01%.

The test is repeated by using the polymer of formula (I) obtained in the example 1 having a wear of 1.05 mm. After 22 hours at 204° C. the loss by weight results to be lower than 0.01%.

The test is repeated by using the polymer of formula (I) obtained in the example 12 having a wear of 1.15 mm. After 22 hours at 204° C. the loss by weight results to be lower than 0.01%.

Example 19 (Comparative)

The loss test at evaporation is carried out to determine the weight loss of a commercial perfluoropolyether oil Fomblin® YR1500 (number average molecular weight=6,600) having a viscosity equal to 1500 cSt at 20° C., a Tg of about −60° C. and a wear equal to 1.0 mm.

After 22 hours at 204° C. the weight loss results to be 0.9%.

The comparison of the data of the examples 18 and 19 points out that the polymer of formula (I) of the present invention results to have a lower weight loss at evaporation compared to a perfluoropolyether oil substantially having the same wear.

Preparation of the Lubricating Compositions and Application Tests

Example 20

A grease was prepared according to the preparation process (A1) by mixing:
- 273 g of the polymer (i) of the example 1;
- 327 g of a perfluoropolyether oil of the class (5), commercially known as Fomblin® M30 having viscosity equal to 280 cSt at 20° C.

The obtained grease results homogeneous and translucid. The penetration value is 278 mm/10'. The grease is subjected to the four-ball wear test and the obtained value is 1.10 mm.

Example 21 (Comparative)

The Example 20 is repeated in order to prepare a grease substantially having the same penetration of the grease of the Example 20, by mixing:
- 327 g of the polymer of the example 3 (comparative);
- 327 g of a perfluoropolyether oil of class (5), commercially known as Fomblin® M30.

The obtained grease shows a penetration value of 281 mm/10'. The grease is then subjected to the four-ball wear test and the obtained value is 1.79 mm.

By comparing the wear values of the Examples 20 and 21 (comparative) it results that, the penetration being equal, the greases of the present invention containing the polymer (i) show improved wear.

Example 22 (Comparative)

The example 20 is repeated but using 300 g of PTFE in powder, commercially known as Algoflon® L206, in substitution of the polymer (i), and 700 g of the perfluoropolyether oil of the example 20.

The so obtained grease has a penetration value of 280 mm/10' and is subjected to the four-ball wear test. The wear value is 1.61 mm.

Example 23 (Comparative)

The Example 20 is repeated using only the perfluoropolyether oil of class (5). The obtained wear value is 1.48 mm.

The comparison between the example 20 of the invention and the two comparative examples 22 and 23 shows as the lubricating composition of the present invention shows a wear value lower than that not only of a conventional grease having the same penetration, but even lower than the basic oil value.

Example 24

A grease is prepared according to the preparation process (B1) by mixing:
- 300 g of the polymer of example 5;
- 360 g of a perfluoropolyether oil of class (5), commercially known as Fomblin® M30.

The obtained grease results homogeneous at room temperature and translucid. The penetration value results 325 mm/10'. The grease is subjected to the four-ball wear test obtaining a wear value of 1.28 mm.

The friction evaluation test for ball bearings is then carried out obtaining a starting value after 1 hour at 16,000 rpm of 30 mN·m and the maximum temperature reached during the test is 165° C.

Example 25 (Comparative)

The grease of the example 22 (comparative) is subjected to the friction evaluation test for ball bearings and a starting value is obtained after 1 hour at 16,000 rpm of 35 mN·m and the maximum temperature reached during the test is 194° C.

The comparison of the data of the example 24 and example 25 (comparative) points out as the lubricating composition of the present invention shows a friction value lower than those of the prior art.

Example 26

A grease is prepared according to the preparation process (B1) by mixing:
- 300 g of the polymer of example 5;
- 200 g of a perfluoropolyether oil of class (5), commercially known as Fomblin® M30.

The obtained grease results homogeneous at room temperature and translucid. The penetration value results 273 mm/10'. The grease is subjected to the four-ball wear test and the obtained value is 1.33 mm. The grease is then subjected to a measurement of weight loss at evaporation at 204° C. for 22 hours obtaining a value of 0.6%.

This grease is subjected to the oil separation test for long times obtaining a value of 0%, i.e. no oil separation is observed.

Example 27 (Comparative)

The oil separation measurement for long times is repeated carried out on the grease obtained in the example 22 (comparative). The obtained value is equal to 0.5%. Furthermore the test of weight loss at evaporation at 204° C. is repeated for 22 hours obtaining a value of 0.9%.

By comparing the data of the example 26 with those of the example 27 (comparative) it results that the greases of the present invention do not show oil separation at 50° C. for long times and show a lower loss at the evaporation measured at 204° C. compared with the conventional greases with the same penetration.

Example 28

The example 20 is repeated but using the compound (i) of the example 3A.

The so obtained grease has been subjected to the SRV test and an average friction coefficient value equal to 0.12 has been obtained.

Example 29 (Comparative)

The SRV test was carried out on the grease obtained in the example 22 (comparative) obtaining a friction coefficient value equal to 0.17.

By comparing the data of the example 28 with those of the example 29 (comparative) it results that the greases of the present invention show a friction coefficient lower than that of conventional greases with the same penetration.

Example 30 (Comparative)

The SRV test was carried out on the basic oil, component (ii), used in the example 28 obtaining a friction coefficient value equal to 0.14.

The comparison between the example 28 of the invention and the two examples 29 (comparative) and 30 (comparative) points out as the lubricating composition of the present invention shows a friction coefficient value lower than that not only of a conventional grease substantially having the same penetration, but even lower than the value of the basic oil.

Example 31

A grease was prepared according to the preparation process (A1) by mixing:
180 g of the compound (i) of the example 4,
20 g of thickener (iii) formed of PTFE in powder prepared according to the patent application US 2005/0,075,250 (high rate) commercially known as XPH 160,
obtaining a 90/10 composition having a penetration value equal to 320 (according to the D 1403 standard).

This grease is subjected to the four ball test and to the loss at evaporation test obtaining wear values equal to 1.1 mm and no loss at evaporation.

Example 32 (Comparative)

The example 31 was repeated for preparing a conventional grease substantially having the same penetration.
There were therefore mixed:
168 g of the component (ii) of class (5) commercially known as Fomblin® M100 having viscosity at 40° C. equal to 770 cSt,
32 g of the thickener (iii) of the example 31,
obtaining a composition 84/16. The penetration obtained according to D 1403 resulted equal to 322. This grease is subjected to the four ball test and to the loss at evaporation test obtaining wear values equal to 1.1 mm and a loss at evaporation equal to 0.15%.

By comparing the data of the example 31 with those of the example 32 (comparative) it results that the polymers (i) can also be used in admixture with suitable thickeners as PTFE to give greases having a good wear without any loss at evaporation.

Furthermore the so obtained greases containing the polymer (i), the penetration being equal, show a lower thickener content compared with greases prepared according to the prior art.

The invention claimed is:

1. Polymers of formula $$T\text{-}O\text{-}[A\text{-}B]_z\text{-}[A\text{-}B']_{z'}\text{-}A\text{-}T' \qquad (I)$$

wherein:

$$A = -(X)_a - O - A' - (X')_b -$$

wherein A' is a perfluoropolyether chain comprising one or more repeating units selected from the group consisting of $(CF_2O)$, $(CF_2CF_2O)$, $(CF_2CF_2CF_2O)$, and $(CF_2CF_2CF_2CF_2O)$, optionally comprising unit $(CF(CF_3)O)$, $(CF(CF_3)CF_2O)$, $(CF_2CF(CF_3)O)$; X, X', equal to or different from each other, are $-CF_2-$, $-CF_2CF_2-$, optionally $-CF(CF_3)-$;

a, b, equal to or different from each other, are integers equal to 0 or 1, with the proviso that the block A linked to the end group T-O— has a=1 and the block A linked to the end group T' has b=0;

B is a block formed of units deriving from one or more olefins, wherein at least one of them is homopolymerizable by radical route, having formula:

$$-[(CR_1R_2-CR_3R_4)_j(CR_5R_6-CR_7R_8)_{j'}]- \qquad (1a)$$

wherein j is an integer from 1 to 5, j' is an integer from 0 to 4 with the proviso that (j+j') is higher than 2 and lower than 5;

$R_1$, $R_2$, $R_3$, $R_4$, $R_5$, $R_6$, $R_7$, $R_8$, equal to or different from each other, are selected from halogen; H; $C_1$-$C_6$ (per)haloalkyl, wherein the halogen is F, Cl; $C_1$-$C_6$ alkyl, optionally containing heteroatoms; or $C_1$-$C_6$ oxy(per)fluoroalkyl;

z is an integer higher than or equal to 2; z' is 0 or an integer; z, z' are such that the number average molecular weight of the polymer of formula (I) is in the range 500-500,000;

B' is a block deriving from one or more olefins and having formula (1a), but having at least one of the substituents $R_1$ to $R_8$ different than in block B, (j+j') being higher than or equal to 2 and lower than 5;

the end groups T and T', equal to or different from each other, are perfluoroalkyls from 1 to 3 carbon atoms, one fluorine atom can be substituted by one chlorine or hydrogen atom; $C_1$-$C_6$ non fluorinated alkyl groups.

2. The polymers according to claim 1, wherein block A is selected from the following structures:

$$(X)_aO[(CF_2O)_n(CF_2CF_2O)_m(CF_2CF_2CF_2O)_p(CF_2CF_2CF_2CF_2O)_q]-(X')_b- \qquad (1)$$

wherein

X, X', equal to or different from each other, are $-CF_2-$, or $-CF_2CF_2-$;

a, b are as defined above;

m, n, p, q are integers, including zero, such that m/n is between 0.1 and 10 when n is different from zero;

(p+q)/(n+m+p+q) is between 0 and 0.05, (n+m+p+q) being different from 0;

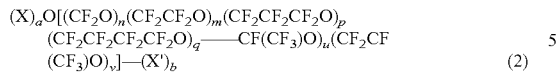  (2)

wherein

X, X', equal to or different from each other, are —$CF_2$—, —$CF(CF_3)$—, or —$CF_2CF_2$—;

a, b are as defined above;

m is an integer higher than or equal to 1, the indexes n, p, q, u, v are integers, zero comprised, with the proviso that (p+q)/(v+m) is between 0 and 0.05 when (v+m) is different from zero; the (v+u)/(n+m) ratio is lower than 1 when (m+n) is different from zero.

3. The polymers according to claim 1, wherein block B derives from one or more homopolymerizable olefins by radical route selected from the group consisting of tetrafluoroethylene (TFE), ethylene (E), vinylidene fluoride (VDF), and chlorotrifluoroethylene (CTFE), optionally in the presence of non homopolymerizable olefins by radical route selected from the group consisting of hexafluoropropene (HFP), (per)fluorovinylethers, and propylene.

4. The polymers according to claim 3, wherein B and B' blocks contain units deriving from perfluorinated olefins selected from the group consisting of TFE and mixtures of TFE and HFP; or B, B' blocks contain units deriving from TFE, and from at least one non perfluorinated olefin.

5. The polymers according to claim 1, wherein z'=0.

6. A process for preparing the polymers according claim 1, comprising the following steps:

(a) reaction of a peroxidic perfluoropolyether comprising at least one of the following units: ($CF_2O$), ($CF_2CF_2O$), ($CF_2CF_2CF_2O$), or ($CF_2CF_2CF_2CF_2O$), having an active oxygen (PO) content between 0.1 and, with at least one homopolymerizable olefin by radical route, optionally in the presence of one or more non homopolymerizable olefins by radical route, at temperatures between 125° C. and 280° C. and at a pressure between 1 bar and 50 absolute bar, by feeding the olefin until obtaining a polymer having a PO lower than 0.1, the ratio between the moles of the olefin and the moles of peroxidic units of perfluoropolyether ranging from 1 to 15;

(b) thermal treatment of the polymer obtained in (a), at temperatures between 200° C. and 280° C., up to the removal of the peroxidic content in the polymer; and (c) neutralization of the polymer obtained in (b) for obtaining the polymers of formula (I).

7. The process according to claim 6, wherein step (a) is carried out in the presence of a fluorinated solvent, and wherein the amount of said fluorinated solvent is such as to have a content of peroxidic perfluoropolyether between 1% and 50% by weight based on the total weight of the solvent plus peroxidic perfluoropolyether.

8. The process according to claim 6, wherein the peroxidic perfluoropolyether is selected from the following classes:

Xo-O($CF_2CF_2O$)$_r$($CF_2O$)$_s$(O)$_t$-Xo'  (II)

wherein

Xo and Xo', equal to or different from each other, are —$CF_2Cl$, —$CF_2CF_2Cl$, —$CF_3$, —$CF_2CF_3$, —$CF_2COF$, or —COF;

r, s and t are integers such that the number average molecular weight is in the range 400-150,000; r/s is between 0.1 and 10 s being different from zero; t is an integer such that the PO is in the above defined range;

X1-O($CF_2CF_2O$)$_r$($CF_2O$)$_s$($CF(CF_3)O$)$_u$($CF_2CF(CF_3)O$)$_v$(O)$_t$—X1'  (III)

wherein

X1 and X1', equal to or different from each other, are —$CF_2Cl$, —$CF_2CF_2Cl$, —$CF_2CF_3$, —$CF_3$, —$C_3F_7$, —$CF(CF_3)COF$, or —COF;

r, s, t, u, v are integers such that the number average molecular weight is in the range 500-150,000; v/(r+s+u) is lower than 1; t is a number such that the PO is in the above defined range;

X2-O($CF_2CF_2O$)$_r$($CF_2O$)$_s$($CF_2(CF_2)_wCF_2O$)$_k$(O)$_t$—X2'  (IV)

wherein

X2 and X2', equal to or different from each other, are —$CF_2COF$, or —COF;

w=1 or 2;

r, s, t and k are integers such that the number average molecular weight is in the range 700-100,000; r/s is between 0.2 and 10, k/(r+s) is lower than 0.05;

t is an integer such that the PO is as defined above.

9. The process according to claim 6, wherein the neutralization step (c) is carried out by fluorination, decarboxylation or alkylation reactions.

10. The process according to claim 6, wherein step (a) is carried out in the presence of UV radiations the wavelength of which is between 200 and 350 nm, at temperatures in the range −100° C. and +100° C., with a ratio between the total moles of the olefin and the moles of peroxidic units of the peroxidic PFPE between 1 and 10.

11. A method of preparing a lubricant comprising polymers of formula (I)

T-O-[A-B]$_z$-[A-B']$_{z'}$-A-T'  (I)

wherein:

A=—(X)$_a$—O-A'-(X')$_b$— wherein A' is a perfluoropolyether chain comprising one or more repeating units selected from the group consisting of ($CF_2O$), ($CF_2CF_2O$), ($CF_2CF_2CF_2O$), and ($CF_2CF_2CF_2CF_2O$), optionally comprising unit (CF($CF_3$)O), ($CF(CF_3)CF_2O$), ($CF_2CF(CF_3)O$); X, X', equal to or different from each other, are —$CF_2$—, —$CF_2CF_2$—, optionally —$CF(CF_3)$—;

a, b, equal to or different from each other, are integers equal to 0 or 1, with the proviso that the block A linked to the end group T-O— has a=1 and the block A linked to the end group T' has b=0;

B is a block formed of units deriving from one or more olefins, wherein at least one of them is homopolymerizable by radical route, having formula:

—[($CR_1R_2$—$CR_3R_4$)$_j$($CR_5R_6$—$CR_7R_8$)$_{j'}$]—  (1a)

wherein j is an integer from 1 to 5, j' is an integer from 0 to 4 with the proviso that (j+j') is higher than 2 and lower than or equal to 10;

$R_1$ $R_2$ $R_3$ $R_4$ $R_5$ $R_6$ $R_7$, $R_8$, equal to or different from each other are selected from halogen; H; $C_1$-$C_6$ (per)haloalkyl, wherein the halogen is F, Cl; $C_1$-$C_6$ alkyl, optionally containing heteroatoms; or $C_1$-$C_6$ oxy(per)fluoroalkyl;

z is an integer higher than or equal to 2; z' is 0 or an integer; z, z' are such that the number average molecular weight of the polymer of formula (I) is in the range 500-500,000;

B' is a block deriving from one or more olefins and having formula (1a), but having at least one of the substituents $R_1$ to $R_8$ different than in block B, (j+j') being higher than 2 and lower than or equal to 10;

the end groups T and T', equal to or different from each other, are perfluoroalkyls from 1 to 3 carbon atoms, one fluorine atom can be substituted by one chlorine or hydrogen atom $C_1$-$C_6$ non fluorinated alkyl groups, the method comprising dissolving or dispersing the polymers of formula (I) in solvents in concentrations between 0.1% and 30% by weight.

12. The method of claim 11, further comprising adding one or more additives selected from the group consisting of antirust, antioxidants, thermal stabilizers, pour point depressants, antiwear for high pressures, antiwear, dispersants, tracers, and dyestuffs, in amounts such that the ratio by weight of the additive with respect to the sum polymer (I) +additive is between 0.005 and 0.1.

13. Lubricant compositions comprising:
(i) a perfluoropolyether-based polymer of formula $$\text{T-O-[A-B]}_z\text{-[A-B']}_{z'}\text{-A-T'} \quad (I)$$

wherein:

wherein A' is a perfluoropolyether chain comprising one or more repeating units selected from the group consisting of $(CF_2O)$, $(CF_2CF_2O)$, $(CF_2CF_2CF_2O)$, and $(CF_2CF_2CF_2CF_2O)$, optionally comprising unit $(CF(CF_3)O)$, $(CF(CF_3)CF_2O)$, $(CF_2CF(CF_3)O)$; X, X', equal to or different from each other, are —$CF_2$—, —$CF_2CF_2$—, optionally —$CF(CF_3)$—;

a, b, equal to or different from each other, are integers equal to 0 or 1, with the proviso that the block A linked to the end group T-O— has a=1 and the block A linked to the end group T' has b=0;

B is a block formed of units deriving from one or more olefins, wherein at least one of them is homopolymerizable by radical route, having formula:

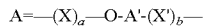

wherein j is an integer from 1 to 5, j' is an integer from 0 to 4 with the proviso that (j+j') is higher than 2 and lower than or equal to 10 (extremes included);

$R_1$, $R_2$, $R_3$, $R_4$, $R_5$, $R_6$, R $R_8$, equal to or different from each other are selected from halogen; H; $C_1$-$C_6$ (per) haloalkyl, wherein the halogen is F, Cl; $C_1$-$C_6$ alkyl, optionally containing heteroatoms; or $C_1$-$C_6$ oxy(per)fluoroalkyl;

z is an integer higher than or equal to 2; z' is 0 or an integer; z, z' are such that the number average molecular weight of the polymer of formula (I) is in the range 500-500,000;

B' is a block deriving from one or more olefins and having formula (1a), but having at least one of the substitutes $R_1$ to $R_8$ different than in block B, (j+j') from 2 to 10 (extremes included);

the end groups T and T', equal to or different from each other, are perfluoroalkyls from 1 to 3 carbon atoms, one fluorine atom can be substituted by one chlorine or hydrogen atom; $C_1$-$C_6$ non fluorinated alkyl groups; and one or more components selected from:

(ii) an oil having viscosity at 20° C. between 10 and 4,000 cSt;

(iii) a thickening agent.

14. The lubricant compositions according to claim 13, wherein the component (ii) is a fluorinated oil or an hydrogenated oil.

15. The lubricant compositions according to claim 14, wherein the component (ii) is a perfluoropolyether oil selected from the group consisting of:

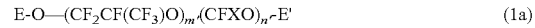 (1a)

wherein

X is equal to F or $CF_3$;

E and E', equal to or different from each other, are selected from $CF_3$, $C_2F_5$ or $C_3F_7$, one fluorine atom of one or of both the end groups being optionally substituted by Cl and/or H;

m' and n' are integers such that the m'/n' ratio is between 20 and 1,000, n' being different from zero; the various units are statistically distributed along the chain, the product viscosity being as defined above;

$$C_3F_7O(CF(CF_3)CF_2O)_{o'}\text{-D} \quad (2a)$$

wherein

D is equal to —$C_2F_5$ or —$C_3F_7$, one fluorine atom of one or both the end groups being optionally substituted by Cl and/or H;

o' is an integer such that the product viscosity is as defined above;

$$\{C_3F_7O\text{---}(CF(CF_3)CF_2O)_{p'}\text{---}CF(CF_3)\text{---}\}_2 \quad (3a)$$

wherein p' is an integer such that the product viscosity is as defined above, one F atom of one or both the $C_3F_7$ end groups being optionally substituted by Cl and/or H;

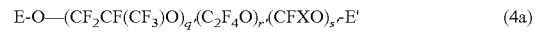 (4a)

wherein

X is equal to F or $CF_3$;

E and E', equal to or different from each other, are as defined above;

q', r' and s' are integers and can also have the 0 value and such that the product viscosity is as defined above;

 (5a)

wherein

E and E', equal to or different from each other, are as defined above;

t' and u' are integers such that the t'/u' ratio is between 0.1 and 5 and the product viscosity is as defined above;

$$\text{E-O}\text{---}(CF_2CF_2CF_2O)_{v'}\text{-E'} \quad (6a)$$

wherein

E and E', equal to or different from each other, are as defined above;

v' is a number such that the product viscosity is as defined above;

$$\text{D-O}\text{---}(CF_2CF_2O)_{z'}\text{-D'} \quad (7a)$$

wherein

D and D', equal to or different from each other, are selected from $C_2F_5$ or $C_3F_7$, one fluorine atom of one or both the end groups being optionally substituted by Cl and/or H;

z' is an integer such that the product viscosity is as defined above;

$$E_1\text{-O}(CF_2O)_n(CF_2CF_2O)_m(CF_2CF_2CF_2O)_p$$
$$(CF_2CF_2CF_2CF_2O)_q\text{-}E_2 \text{ wherein} \quad (8a)$$

$E_1$ and $E_2$ are perfluoroalkyl end groups equal to or different from each other, having formula —$(CF_2)_zCF_3$, wherein z is an integer from 0 to 3;

n, m, p, q are integers equal to or different from each other between 0 and 100 and selected so that the oil viscosity is as defined above and such that the m/n ratio is between 2 and 20; (p+q)/(n+m+p+q) is between 0.05 and 0.2, n/(n+m+p+q) is between 0.05 and 0.40, (n+m+p+q) being different from 0.

16. The lubricant compositions according to claim 13, wherein the thickening agent (iii) is selected from the group consisting of PTFE, talc, silica, boron nitride, polyurea, terephthalamate of alkaline or alkaline-earth metals, calcium and lithium soaps, and their complexes.

17. The lubricant compositions according to claim 13, further comprising one or more additives (iv) selected from the group consisting of antirust, antioxidants, thermal stabilizers, pour point depressant, antiwear for high pressures, antiwear, dispersants, tracers, and dyestuffs.

18. A process for preparing the lubricant compositions of claim 13 in the form of liquids comprising mixing the perfluoropolyether-based polymer with the at least one or more components.

19. A process for preparing the compositions of claim 17 in the form of greases by dry mixing (A1), comprising the following steps:

feeding of the component (i) in a mixer in the desired amount, making then the vacuum and subsequently heating up to 150° C. for at least two hours;

optional feeding of the component (iv);

feeding of the components (ii) and/or (iii), heating stop and mixing for at least four hours;

stop of the mixer running and vacuum and discharge of the obtained grease; and refining of the obtained grease by passage on a three cylinder refiner.

20. A process for preparing the compositions of claim 17 in the form of greases by mixing with solvent (B1), comprising the following steps:

feeding of the component (i), optionally in the presence of the component (iv), in a mixer in the desired amount, feeding of a fluorinated solvent having a low boiling point, preferably between 50° C. and 100° C., preferably in an amount by weight equal to the component (i) and mixing for at least two hours;

feeding of the components (ii) and/or (iii), heating interruption and mixing for at least four hours;

stripping of the solvent until obtaining a grease and collection of the solvent;

mixing for at least 1 hour under vacuum and discharge of the obtained grease; and refining of the obtained grease by passage on a three cylinder refiner.

* * * * *